United States Patent [19]
Ota et al.

[11] Patent Number: 5,986,790
[45] Date of Patent: Nov. 16, 1999

[54] LIGHT SOURCE FOR OPTICAL COMMUNICATION, OPTICAL TRANSCEIVER AND OPTICAL COMMUNICATION NETWORK

[75] Inventors: Takeshi Ota; Yutaka Ogawa; Kouichi Yoshimura; Kazunori Horikiri, all of Nakai-machi, Japan

[73] Assignee: Fuji Xerox, Co., Ltd., Tokyo, Japan

[21] Appl. No.: 08/804,292

[22] Filed: Mar. 3, 1997

[30] Foreign Application Priority Data

Mar. 5, 1996 [JP] Japan ................................. 8-047056
Apr. 9, 1996 [JP] Japan ................................. 8-086407

[51] Int. Cl.$^6$ ................................................. H04B 10/04
[52] U.S. Cl. ........................... 359/180; 359/160; 359/188
[58] Field of Search ..................................... 359/180–181, 359/172, 160, 134, 130, 142

[56] References Cited

U.S. PATENT DOCUMENTS

| | | | |
|---|---|---|---|
| 5,227,908 | 7/1993 | Henmi ..................................... | 359/181 |
| 5,282,257 | 1/1994 | Ota . | |
| 5,657,145 | 8/1997 | Smith ..................................... | 359/181 |
| 5,732,169 | 3/1998 | Riant et al. ............................. | 359/130 |

FOREIGN PATENT DOCUMENTS

| | | |
|---|---|---|
| 3-91329 | 4/1991 | Japan . |
| 3-108823 | 5/1991 | Japan . |
| 3-92840 | 9/1991 | Japan . |
| 3-296332 | 12/1991 | Japan . |
| 5-3457 | 1/1993 | Japan . |
| 6-85374 | 3/1994 | Japan . |

OTHER PUBLICATIONS

T. Ota, "Four–Port Mulitmode Interconnectable Star Coupler" Electronic Letters, vol. 29, May 13, 1993, No. 10, pp. 919–920.

T. Ota, "Coupled Star Network: A New Configuration for Optical Local Area Network" IEICE Trans. Commun. vol. E75–B, No. 2, Feb. 1992.

T. Ishigure, "High–Bandwith, High–Numerical Aperture Graded–Index Polymer Optical Fiber" Journal of Lightwave Technology, vol. 13 No. 8, Aug. 1995.

M. Zirngibl, et al. "Characterization of a Multiwavelength Waveguide Grating Router Laser" IEEE Photonics Technology Letters, vol. 6, No. 9, Sep. 1994.

A. Mar, et al. "Mode–Locked Operation of a master Oscillator Power Amplifier", IEEE Photonics Technology Letters, vol. 6, No. 9, Sep. 1994.

*Primary Examiner*—Kinfe-Michael Negash
*Attorney, Agent, or Firm*—Oliff & Berridge, PLC

[57] ABSTRACT

The invention provides a light source for optical communication. The light source includes a spontaneous emission generator, an optical wavelength band narrower, an optical modulator, and an optical amplifier. The spontaneous emission generator generates non-coherent light which is band narrowed, modulated and amplified for a wireless optical communication in free space. The invention avoids a health hazard in respect of human eyes and remove a noise based on a spontaneous emission generated from an optical amplifier.

6 Claims, 28 Drawing Sheets

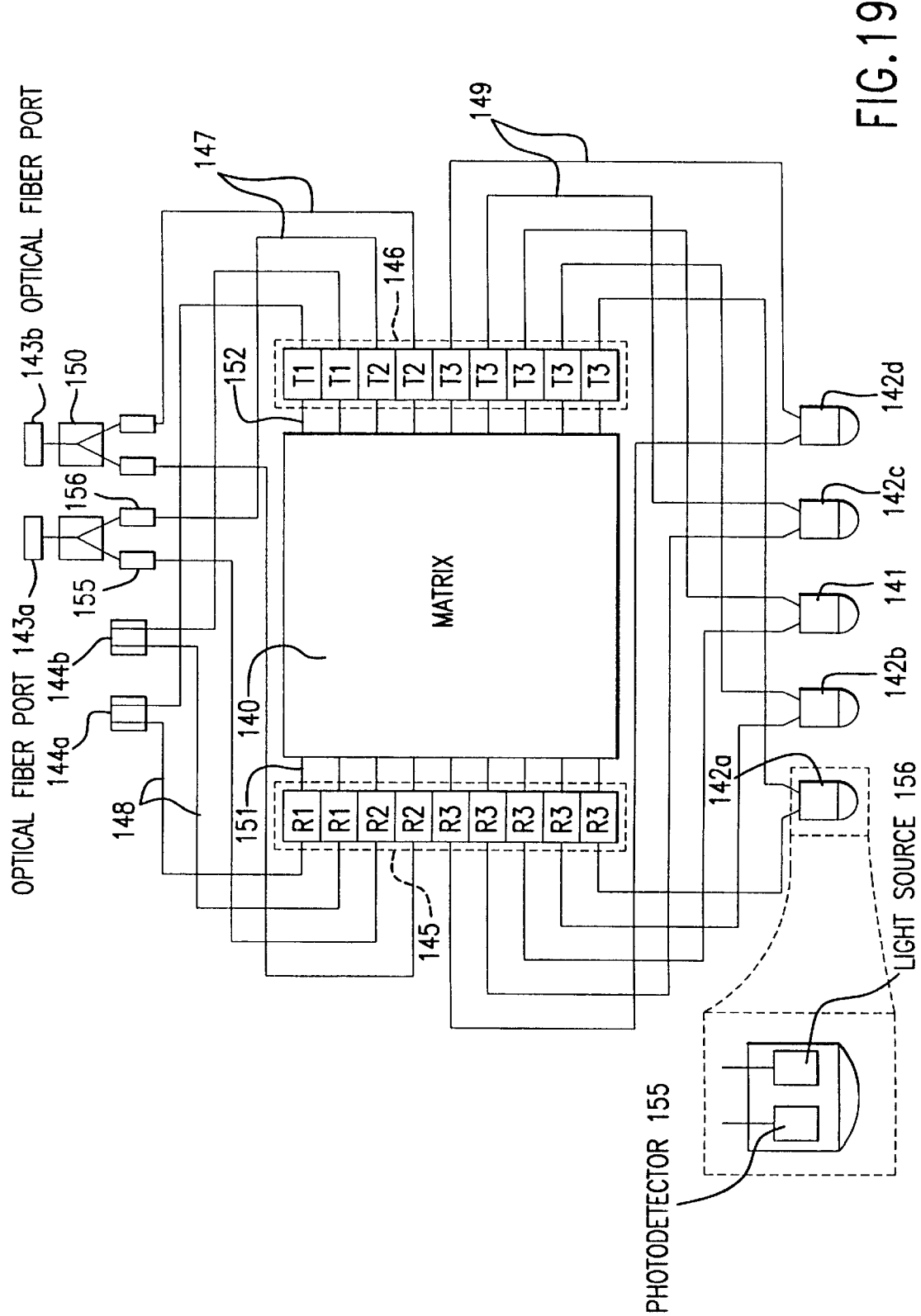

LIGHT SOURCE FOR OPTICAL COMMUNICATION, OPTICAL TRANSCEIVER AND OPTICAL COMMUNICATION NETWORK

BACKGROUND OF THE INVENTION

1. Field of Invention

The present invention relates to a modulated light source for optical communication, a wavelength multiplexed optical transceiver, and an optical amplifier. This invention also relates to a wireless communication optical transceiver, and more particularly a wireless communication optical transceiver usable for free space optical transmission. This invention also relates to an active star coupler, and more particularly, an active star coupler regarding free space optical transmission, optical fiber transmission, and transmission via twisted pair cables. Further, this invention relates to an optical communication network including free space optical transmission, optical fiber transmission.

2. Description of Related Art

An optical wireless LAN system has already been commercially available. There is the standard called IrDA (Infrared Data Association) for the point-to-point optical transmission systems using free space light.

Japanese Patent Laid-Open No. Hei. 3-91329 discloses a communication system, which should be called a "cellular network using free space optical signal". FIG. 28 shows the communication system. A mobile station 230 is provided with communication means 231 which adopts a spatial diversity system using free space light. Further, optical stations 232a and 232b, which are base stations for free space optical communication, are provided at important positions. The optical stations 232a and 232b are connected each other by means of a wiring network 237, and are connected to the optical station control station 233. The optical station control station 233 is connected to the public network circuit 236 via the mobile optical telephone exchange station 235.

The mobile station 230 and the control station 233 negotiate via optical stations 232a and 232b, and determine an optical station to be linked. This process is a control process, what is called "hand-over", and is basically the same as the control process of a cellular communication network. In the cellular communication network, adjacent cells use different frequencies to prevent interference between them. The system disclosed in Hei. 3-91329 prevents interference between adjacent cells by means of optical spatial diversity.

Japanese Utility Model Laid-Open No. Hei. 3-92840 discloses a system shown in FIG. 29. This system is provided with plural infrared transmitters 241a through 241c suspended from the ceiling 240. They communicate to each other by means of the horizontal free space light 243, and transmit vertical optical light 244 to the mobile station 242 being below them.

Japanese Patent Laid-Open No. Hei. 3-108823 discloses an optical communication apparatus which combines a transmission optical system having a narrow dispersion angle usable for long-distance communication and a transmission optical system having a wide dispersion angle usable for short-distance communication.

Japanese Patent Laid-Open No. Hei. 3-296332 discloses an interconnectable active star coupler. FIG. 30 shows the star coupler provided with a diode matrix 255 to realize a transmission matrix in which all diagonal elements are set to zero. Signals from input optical fibers 251 are transmitted to output optical fibers 252 via receivers 253, diode matrix 255 and transmitters 254. The diode matrix 255 consists of plural diodes 153, and diodes in the part 154 corresponding to the diagonal elements are removed to realize a transmission matrix in which all diagonal elements are zero. Takeshi Ota, "Coupled star network: A new configuration for optical local area network", IEICE Trans. Commun., Vol. E75-B, No.2, pp.67–75 (1992) also disclose the star coupler in detail.

Japanese Patent Laid-Open No. Hei. 5-3457 (U.S. Pat. No. 5,282,257) disclose an interconnectable passive star coupler. FIG. 31 shows the star coupler provided with an optical waveguide circuit 263 formed in a substrate 262 to realize a transmission matrix in which all diagonal elements are set to zero. In FIG. 31, a reference numeral 261 denotes optical fibers. Takeshi Ota, "Four-port multimode interconnetable star coupler", Electron. Lett., Vol. 29, No. 10, pp.919–920 (1993) also discloses this star coupler in detail.

Hei. 5-3457 further discloses an optical communication network combining interconnectable star couplers and optical fibers.

The above-described optical wireless networks using free space light and point-to-point optical transmission system have been already commercially available. However, the system which links a backbone network to terminals, such as an optical wireless local area network (LAN), has no compatibility with a system communicating between terminals, such as IrDA. Each system is constructed by itself and it is inconvenient for users to deal with each system in a different way.

In recent years development of the plastic optical fiber (POF) of a graded index (GI) type is significant. A GI type POF having the core diameter of 500 m, the numerical aperture (NA) of 0.5 and a transmitting band of 600 MHzkm has been reported (refer to T. Ishigure et al. "High-Bandwidth, High-Numerical Aperture Graded-Index Polymer Optical Fiber" IEEE J. Lightwave Technol, vol. 13, No. 8, pp1686–1691 (1995)). When an optical fiber having a large core diameter and a large numerical aperture is used, it is expected that direct connection of the free space transmitting light with a light transmitting through optical fibers, is facilitated. However, an optical amplifier adaptable to an optical fiber having a large core diameter is difficult to fabricate. In order to provide a constant excited light density in a fiber type optical amplifier, the intensity of an excited light must be increased in proportion to a square of a core diameter, which is unrealistic. In the case of a semiconductor laser amplifier, although the stripe width can be widened comparatively easily, it is difficult in view of the fabrication process to thicken the thickness of the laser amplifier.

A wavelength multiplexed optical transceiver as shown by FIG. 33 has been known (refer to Japanese Published Unexamined Patent Application No. Hei 6-85374). The wavelength multiplexed optical transceiver constituted by an integrated circuit board 11 where optical wave guide paths are integrated, a diffraction grating substrate 14, a photodiode array 15, a semiconductor laser array 16 and an optical fiber 20. A first slab wave guide path (for sending) 12, a second slab wave guide path (for receiving) 13, a first optical coupler 17, a second optical coupler 18 and optical wave guide paths for wirings 19a through 19k are formed on the integrated circuit board 11. Two sets of Fresnel reflecting mirrors 14a and 14b are formed on the diffraction grating substrate 4 and are attached thereto to correspond to the first slab wave guide path 12 and the second slab wave guide path 13, respectively.

The first slab wave guide path 12 and the semiconductor laser array 16 one end face of which is provided with a reflection free coating, are connected by the wave guide paths for wirings 19a through 19e. The wave guide paths for wirings 19a through 19d are connected to a polychromater unit 24 of the first slab wave guide path. The semiconductor laser array 16 is arranged with five semiconductor laser elements. The one end face of the semiconductor laser array 16 is provided with the reflection free coating and the face provided with the reflection free coating is attached to the side of the glass substrate 11. An output unit (common unit) 23 of the first slab wave guide path is connected to the first optical coupler 17. One branch of the optical coupler 17 is connected to the semiconductor laser array 16 via the optical wave guide path for wiring 19e and the other branch is connected to the second optical coupler 18 via the optical guide path for wiring 19e, respectively. A common terminal of the optical coupler 18 is connected to the optical fiber 20.

A laser beam, whose wavelengths are multiplexed can be emitted by the semiconductor laser array 16, the first slab wave guide path 12 and the Fresnel reflecting mirror 14a. The laser beam from the output unit (common unit) 23 of the slab wave guide path 12 is branched by the first optical coupler 17 whereby a portion of the optical output is outputted to the optical fiber 20 via the second optical coupler 18.

The second slab wave guide path 13 and the photodiode array 15 are also connected by the optical wave guide paths for wirings 19h through 19k. Four photodiodes are aligned at the photodiode array 15. An input unit (common unit) 25 of the second slab wave guide path 13 is connected to the second optical coupler 18 by the optical wave guide path for wiring 19g. Further, the optical wave guide paths for wirings 19h through 19k are connected to a polychromater unit 16 of the second slab wave guide path.

An optical signal transmitted from the outside via the optical fiber 20 is branched by the second optical coupler 18 and is led to the second slab wave guide path via the optical wave guide for wiring 19g. The optical signal is divided and focused by the Fresnel reflecting mirror 14b, passes through the optical wave guide paths for wirings 19h through 19k and is converted into electric signals.

It has been reported that a wavelength multiplexed laser oscillator adopted in the sending unit of the wavelength multiplexed optical transceiver cannot conduct high speed modulation since the cavity length is long (refer to M. Zingbl et al.,: "Characterization of a Multiwavelength Waveguide Grating Router Laser", IEEE, Photon. Technol. Lett., vol. 6, No. 9, pp1082–1084 (1994)).

Further, in recent times, a technology referred to as MOPA (Master Oscillator Power Amplifier) has been developed. As schematically shown in FIG. 33, a light from a master oscillator 61 is amplified by a power optical amplifier 64 whereby an output 65 is outputted. A laser beam source having a narrowed band, such as a DFB laser, is frequently used as a master oscillator. The MOPA is often used with a main purpose of promoting the laser output (refer to, for example, Alan Mar et al.,: "Mode-Locked Operation of a Master Oscillator Power Amplifier", IEEE, Photon. Technol. Lett., vol. 6, No. 9, pp1067–1069 (1994)).

SUMMARY OF THE INVENTION

The inventors have devised a novel optical communication network using an optical transceiver for wireless communication and active type star couplers. According to FIG. 32, there is disclosed a network integrating cells 55 each constituted by a free space transmitting light by a wired network 58 constituted by connecting passive type 4-terminals star couplers 51 which are mutually connectable, via optical fibers 52 and bidirectional optical relay amplifiers 53. An optical signal 59 from a mobile station 57 within the cell 55 or the optical signal 59 to be sent to the mobile station 57 links with the wired network 58 via the optical relay amplifiers 54 for relaying the free space transmitting light and a guided light. According to such a constitution, information can be exchanged between the mobile station 57 and a fixed station (a server etc.) 56 of the wired network 58 and further, information can be exchanged between the mobile station 57 and other mobile stations, not illustrated. A bidirectional optical relay amplifier 53 adopts a system where an optical signal is converted into an electric signal, the electric signal is amplified and thereafter, converted into an optical signal again, that is referred to as a regenerative relay amplifier. An optical relay amplifier 54 for relaying the free space transmitting light and the guided light also uses the structure of the regenerative relay amplifier.

It is conceivable in the network of FIG. 32 to adopt optical amplifiers for the bidirectional optical relay amplifiers 53 and the optical relay amplifiers 54 for relaying the free space transmitting light and the guided light. However, a laser beam cannot be used as a light source for generating the light signal in the network of FIG. 32 in the case of the free space light transmission due to a necessity for preventing a health hazard in respect of human eyes. Therefore, it was difficult to adopt optical amplifiers in the network of FIG. 32. Because the light amplifier always emits the spontaneous emission and therefore, if a light having a wide band width such as a light from an LED (light emitting diode) is used as a light source of the optical signal, the spontaneous emission emitted from the optical amplifier constitutes a noise in respect of an amplified light. The laser beam is provided with a narrow band and therefore, the spontaneous emission emitted from the optical amplifier can be removed by using an optical filter, however, this method cannot be used when the light from an LED is used as a light source. FIG. 35A illustrates a spectrum of an output from an optical amplifier when a laser beam is amplified by the optical amplifier and FIG. 35B illustrates a spectrum of an output from an optical amplifier when a light from an LED is amplified by an optical amplifier, respectively. According to FIG. 35B, the signal light per se becomes a so-called amplified spontaneous emission (ASE: Amplified Spontaneous Emission).

The present invention has been made in view of the above circumstances. It is therefore an object of the invention to make applicable an optical amplifier to a relay amplifier on a wired network and a relay amplifier at an interface unit disposed between an optical fiber and a free space in a network where optical fiber transmission and free space transmission are fused together. More specifically, it is an object of the present invention to resolve simultaneously the above-described problems of avoiding a health hazard in respect of human eyes and removing a noise based on a spontaneous emission generated from an optical amplifier.

It is an another object of the present invention to provide a structure whereby an optical fiber and a free space are directly connected with each other.

It is an another object of the present invention to enhance an upper limit of a modulating speed that is determined by prolongation of a cavity length in a wavelength multiplexed optical transceiver.

Further, it is an object of the invention to provide a wireless communication optical transceiver used in a communication system which combines a system which links a backbone network to terminals, such as an optical wireless LAN, and a system to communicate between terminals, such as IrDA.

The objects and advantages of the invention may be realized and attained by means of the instrumentalities and combinations particularly pointed out in the appended claims. To achieve the objects and in accordance with the purpose of the invention, this invention provides a light source for optical communication including spontaneous emission generating means, optical wavelength band narrowing means, optical modulating means and optical amplifying means.

According to an another aspect of the present invention, there is provided a wavelength multiplexed optical transceiver including wavelength multiplexing means in addition to the above-described constitution.

According to an another aspect of the present invention, there is provided an optical amplifier including a lower clad layer grown by a liquid phase epitaxy method, an activation region grown by a metal organic vapor phase epitaxy method or a molecular beam epitaxy method and an upper clad layer grown by the liquid phase epitaxy method.

According to an another aspect of the present invention, there is provided an optical communication network including the light source for optical communication, the optical amplifier, passive type optical distributing means and an optical fiber.

According to an anther aspect of the present invention, there is provided a wireless communication optical transceiver including a first transmission and reception unit for communication with backbone network and a second transmission and reception unit for communication between wireless communication optical transceivers.

This invention also provides an active star coupler which includes a transmission and reception unit to link to optical signals propagating through a free space, a transmission and reception unit to connect to an optical fiber or an electric line, and a matrix logical circuit having a transfer characteristic in which all of diagonal elements are zero.

This invention further provides a portable information terminal which includes a body part provided with a keyboard, a cover part which is provided with a display and is folded up into the body part, a wireless communication optical transceiver of the present invention.

This invention further provides an optical network which includes a wireless communication optical transceiver of the present invention and an active star coupler of the present invention.

According to the light source for optical communication of the present invention, an optical signal a band of which is narrowed and which has low space coherence can be generated.

According to the wavelength multiplexed optical transceiver of the present invention, an optical signal where wavelengths are multiplexed can be generated without using a laser oscillation.

According to the optical amplifier of the present invention, a semiconductor laser amplifier having a thick clad layer is provided and therefore, an optical amplifier coupled with a plastic optical fiber having a large core diameter with a large coupling efficiency can be realized.

According to the optical communication network of the present invention, an optical signal capable of being transmitted in a free space can optically be amplified. Also, an adverse effect of an optical signal transmitted in a free space in respect of human eyes can be prevented.

BRIEF DESCRIPTION OF THE DRAWINGS

FIG. 19 shows an internal configuration of the active star coupler of FIGS. 18A and 18B.

FIG. 35A shows a spectrum of an output from an optical amplifier when a signal light that is a laser beam is amplified by the optical amplifier and FIG. 35B shows a spectrum of an output from an optical amplifier when a signal light that is a light from an LED is amplified by the optical amplifier.

DETAILED DESCRIPTION OF PREFERRED EMBODIMENTS

Figure 1A:
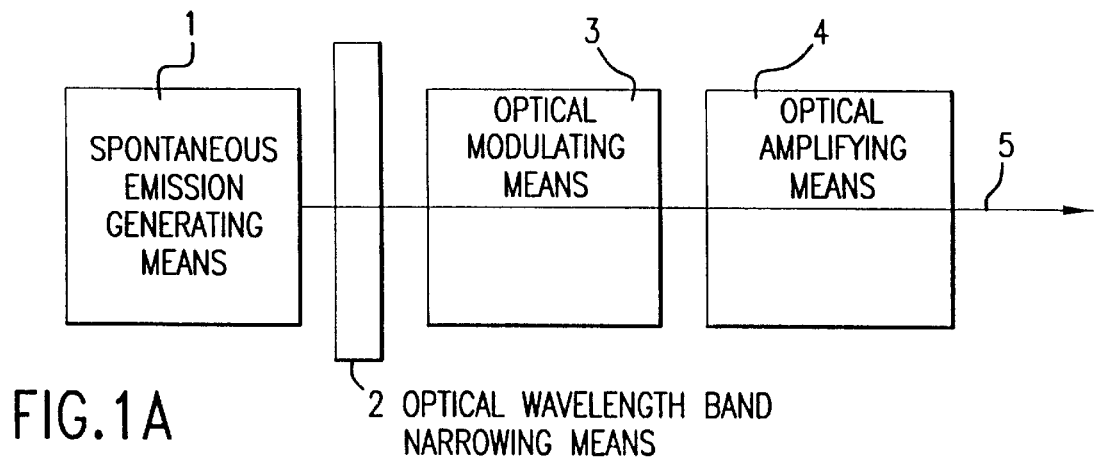
FIGS. 1A, 1B and 1C are outline views showing the principle of a light source for optical communication according to the present invention.

FIG. 1A shows the principle of a light source for optical communication according to the present invention. It is the principle of the present invention that a light from a spontaneous emission generating means 1 is subjected to an optical wavelength band narrowing means 2, an optical modulating means 3 and an optical amplifying means 4 by which an output light 5 is outputted.

The spontaneous emission generating means 1 is specifically a light emitting diode (LED), a lamp or the like. The optical wavelength band narrowing means 2 is specifically a diffraction grating, an elalon, an interference filter, a dichroic mirror or the like. The optical modulating means 3 is specifically an electrooptic modulator, an acousticooptic modulator, an electrooptic absorption modulator or the like. The optical amplifying means 4 is a semiconductor laser amplifier, a fiber optical amplifier or the like. The optical modulating means 3 and the optical amplifying means 4 may be integrated. A method where a semiconductor laser amplifier is adopted for the optical amplifying means 4 and the drive current of the semiconductor laser amplifier is modulated, may be pointed out as an example.

As a representative constitution, a light emitting diode (LED) is used for the spontaneous emission generating means 1, an interference filter is used for the optical wavelength band narrowing means 2, an AlGaAs group quantum well electrooptic absorption modulator using an effect of confining quantum is used for the optical modulating means 3 and a semiconductor laser amplifier is used for the optical amplifying means 4.

The coherence of a light from the spontaneous emission generating means 1 such as a light emitting diode is far smaller than that of a laser beam even if the band thereof is narrowed by an interference filter or the like. Accordingly, even if the light is emitted in a free space, a spot of a diffraction limit is not caused on the retina of the human eye. This is because even if the band of the spontaneous emission is narrowed, although the temporal coherence is increased, the spatial coherence is not increased and in respect of the temporal coherence, a complete coherence cannot be established since various components of phases are included in the same wavelength of light. Meanwhile, in removing a spontaneous emission generated by an optical amplifier, the purpose can be achieved only if the wavelength spectrum is simply narrowed in respect of the band.

Figure 1B:
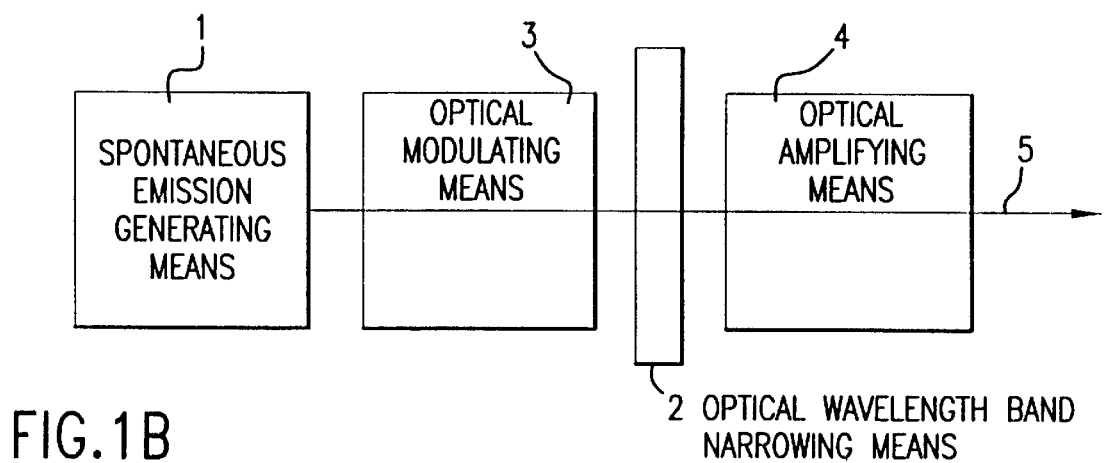
Figure 1C:
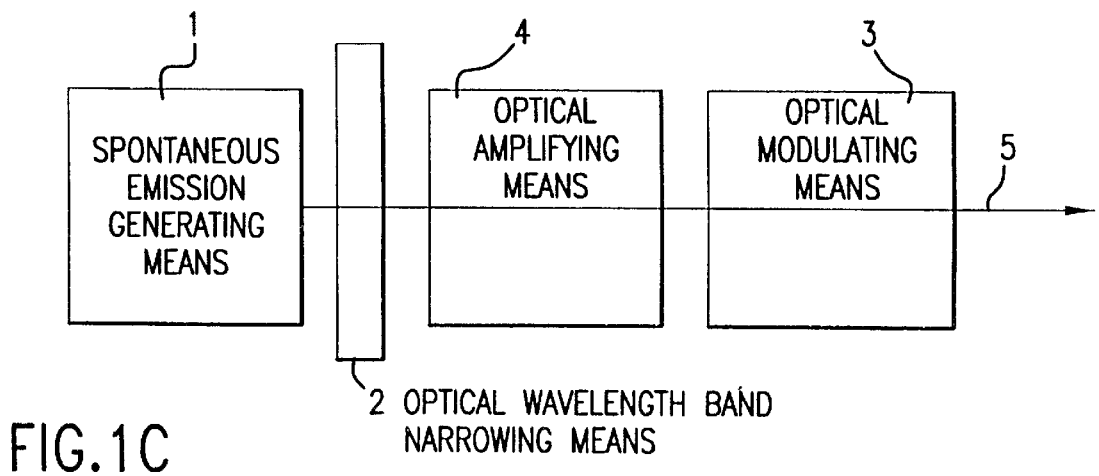

With regard to FIGS. 1A, 1B and 1C, the order of the optical wavelength band narrowing means 2, the optical modulating means 3 and the optical amplifying means 4 may be changed. The optical wavelength band narrowing means 2 may be put between the optical modulating means 3 and the optical amplifying means 4 as illustrated by FIG. 1B or these components may be arranged in the order of the optical wavelength band narrowing means 2, the optical amplifying means 4 and the optical modulating means 3 as shown by FIG. 1C.

Figure 34:
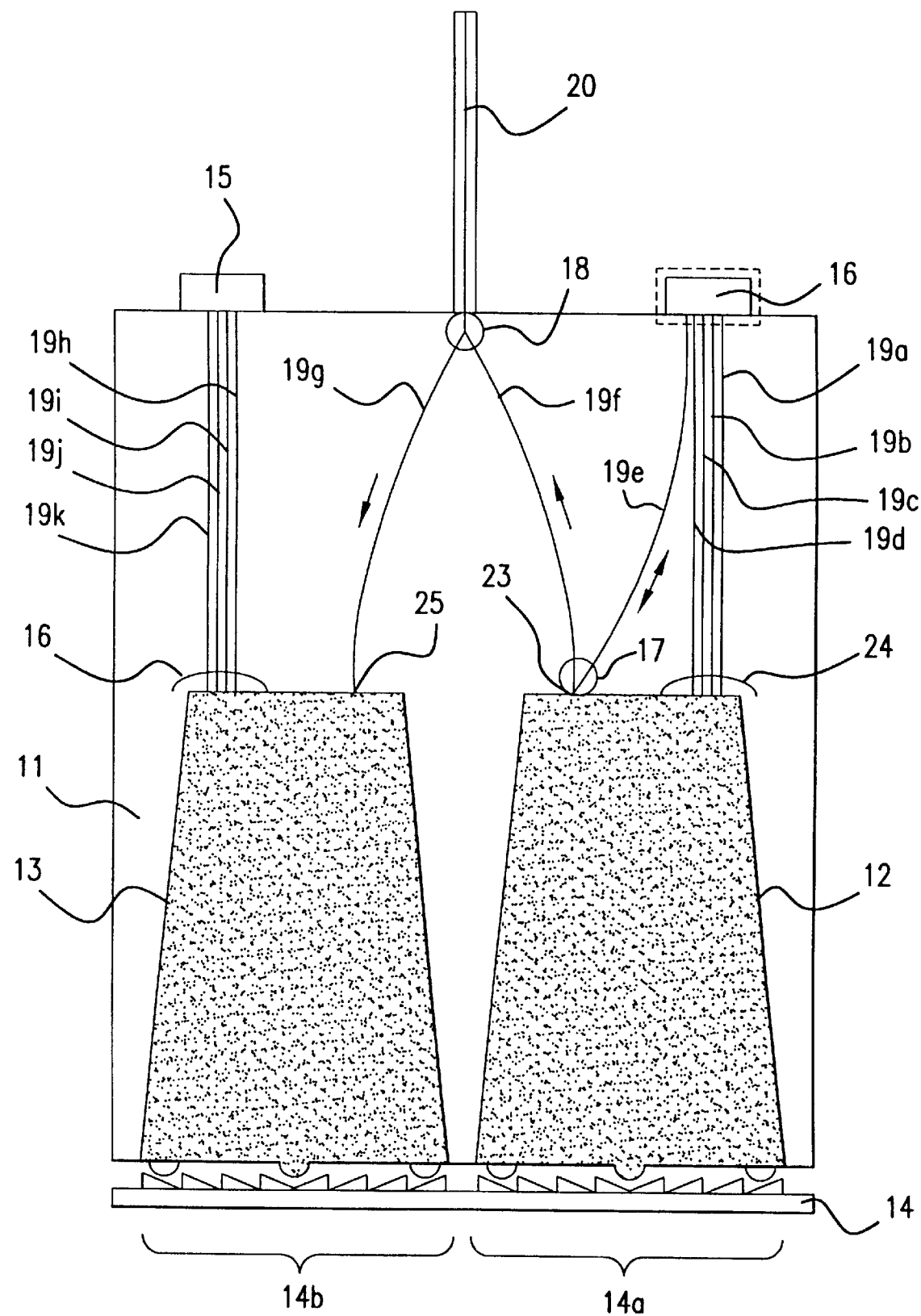
FIG. 34 is a view showing an MOPA (Master Oscillator Power Amplifier) of a conventional example.
Figure 35A:
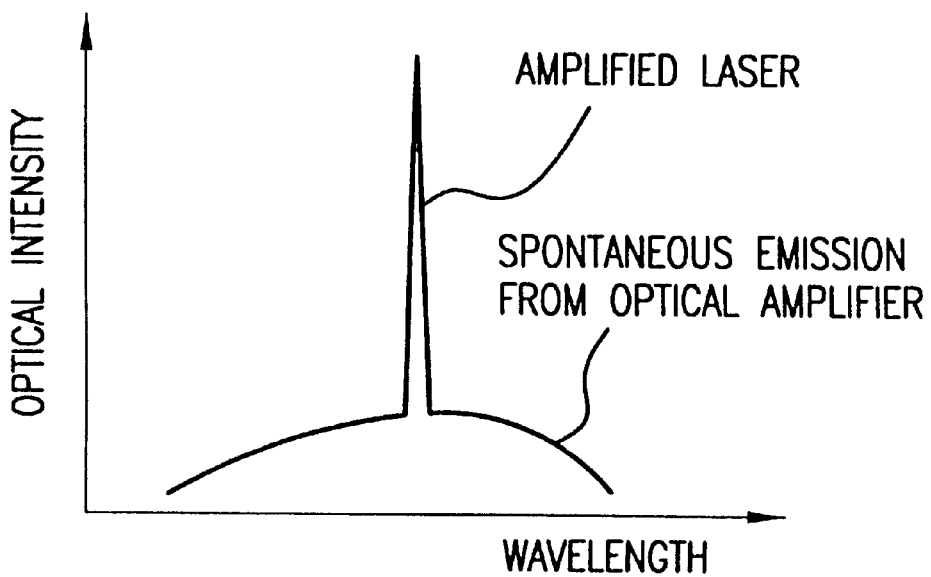
FIGS. 35A and 35B are diagrams where
Figure 35B:
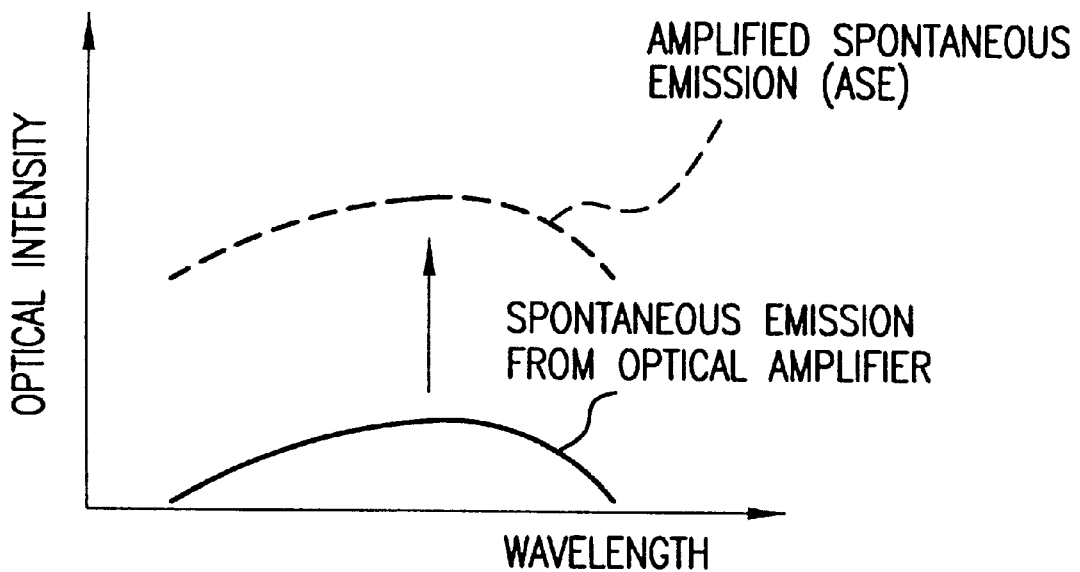

The difference between the present invention and the MOPA shown by FIG. 34 resides in that a spontaneous emission is used as a light source, the wavelength band narrowing means is provided and the optical modulating means is provided. The difference gives rise to a significant effect where a danger resulting in a health hazard in respect of human eyes is diminished and the generation of a noise caused by the spontaneous emission can be prevented in optical amplification.

Embodiment 1

Wavelength Multiplexed Laser Oscillator

Figure 2:
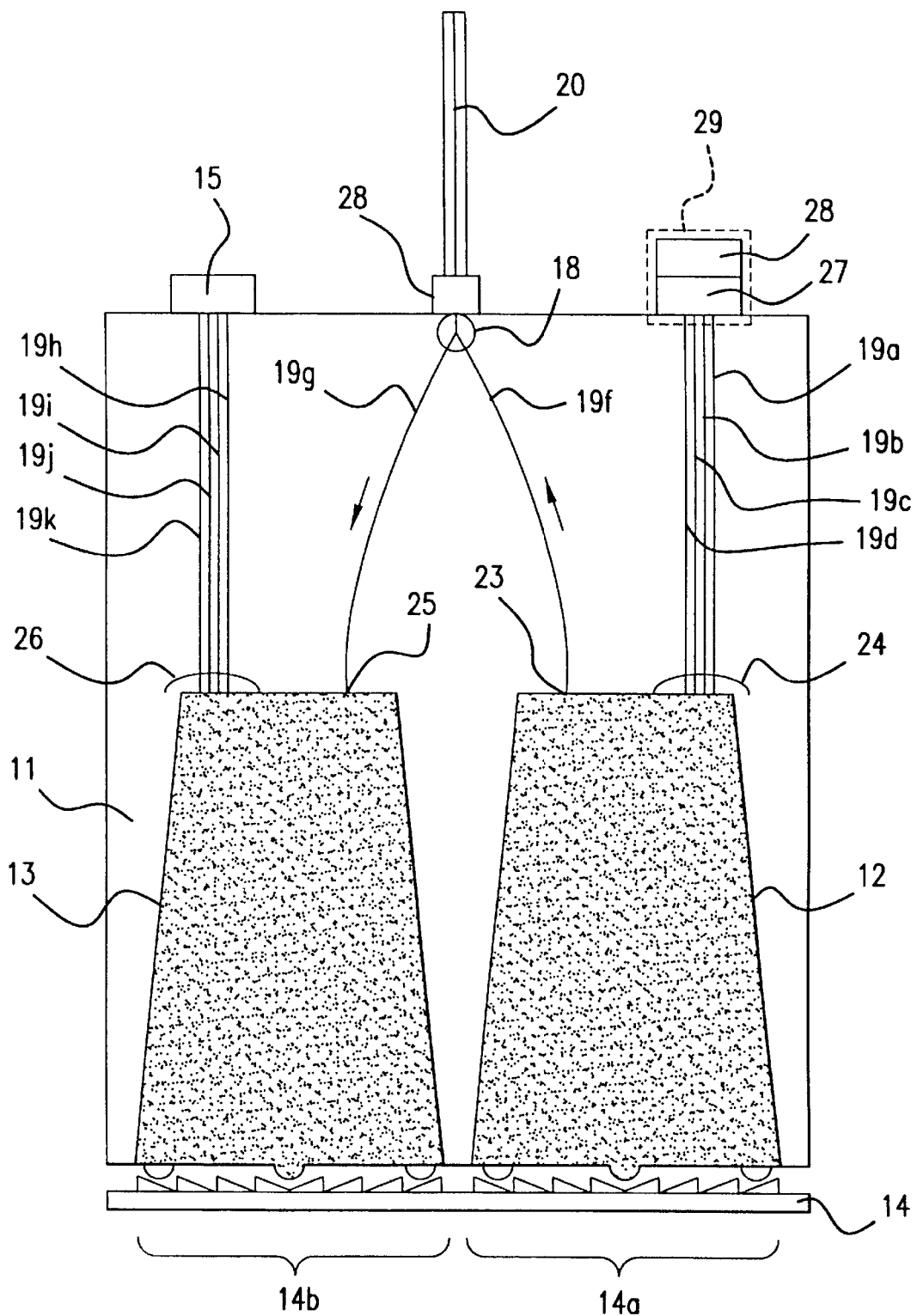
FIG. 2 is a plane view showing the constitution of a wavelength multiplexed optical transceiver according to the present invention.
Figure 33:
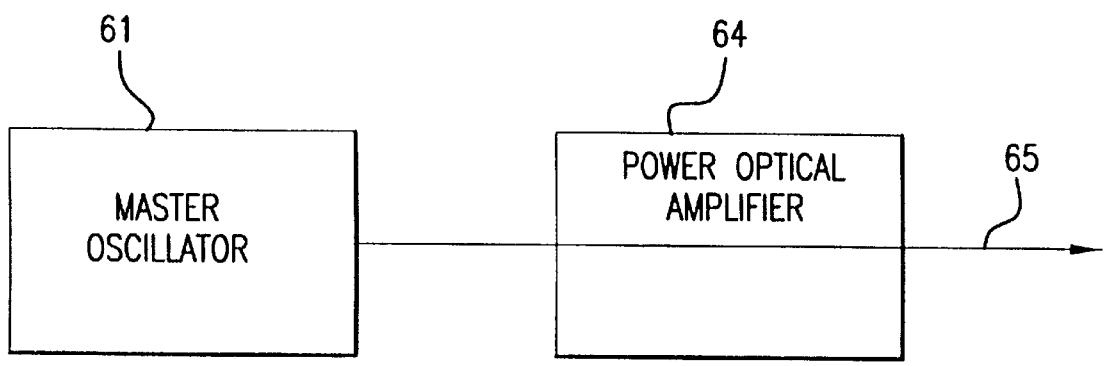
FIG. 33 is a wavelength multiplexed optical transceiver of a conventional example.

FIG. 2 shows a constitution where the principle shown by FIGS. 1A, 1B and 1C is applied to the wavelength multiplexed optical transceiver of FIG. 34. The difference between FIG. 34 and FIG. 2 resides in that a surface emitting type LED light source 26 and a surface emitting type AlGaAs alloy quantum well electrooptic absorption modulator 27 are used in place of the semiconductor laser array 16 and a semiconductor laser optical amplifier 28 is provided between the output optical fiber 20 and the optical coupler 18. A GI-POF having the core diameter of 500 $\mu$m can be used as the output optical fiber 20. Further, the optical coupler 17 and the optical wave guide path 19e which are present in the constitution of FIG. 33 are omitted. The optical coupler 17 and the optical wave guide path 19e are constituent components for an optical feedback system for laser oscillation which are dispensed with according to the present embodiment. As the output optical fiber 20, the above-described grated-index (GI) type plastic optical fiber (POF) having the core diameter of 500 $\mu$m and the numerical aperture (NA) of 0.5 $\mu$m was used.

Figure 3:
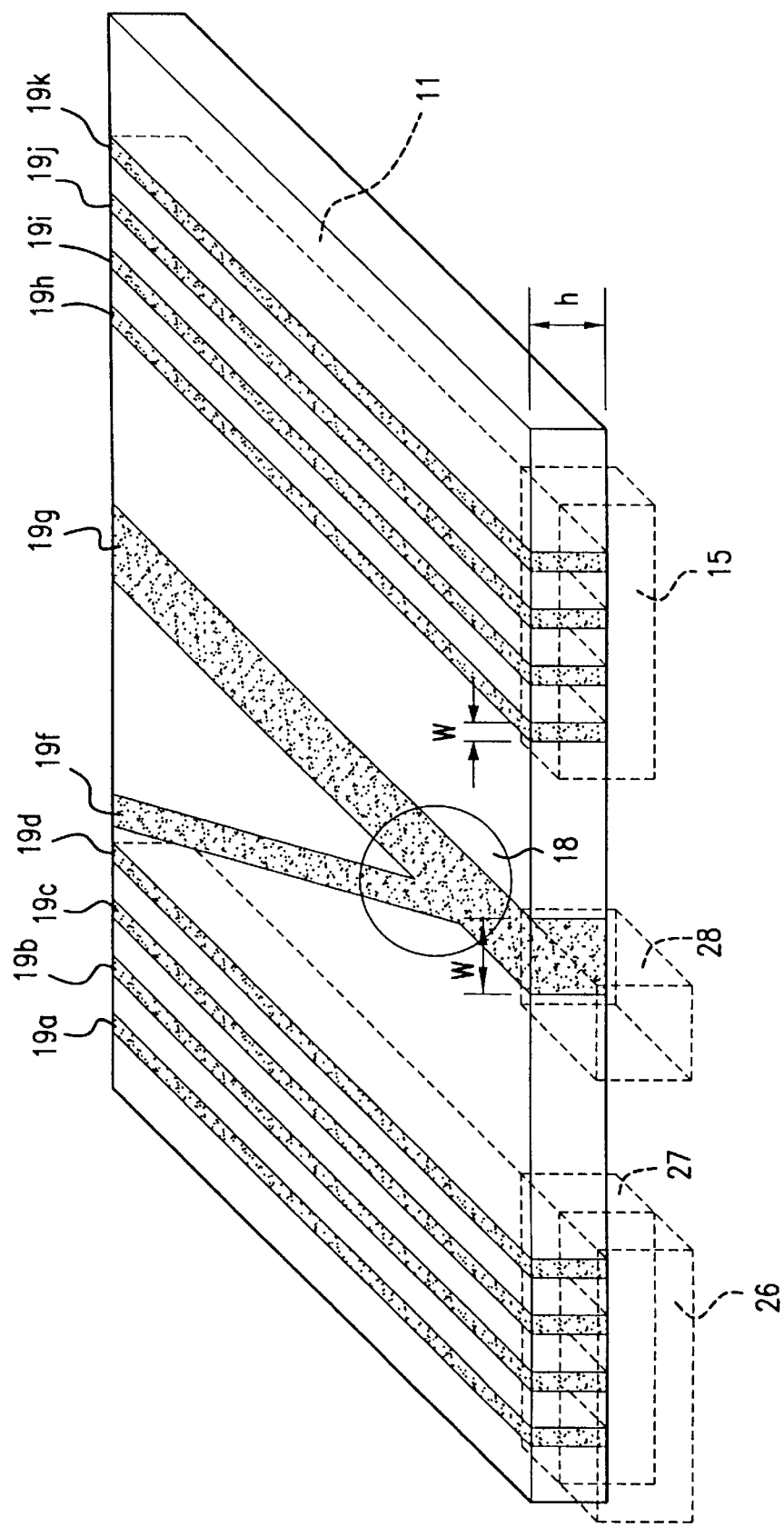
FIG. 3 is a magnified view of essential portions of FIG. 2.
Figure 4:
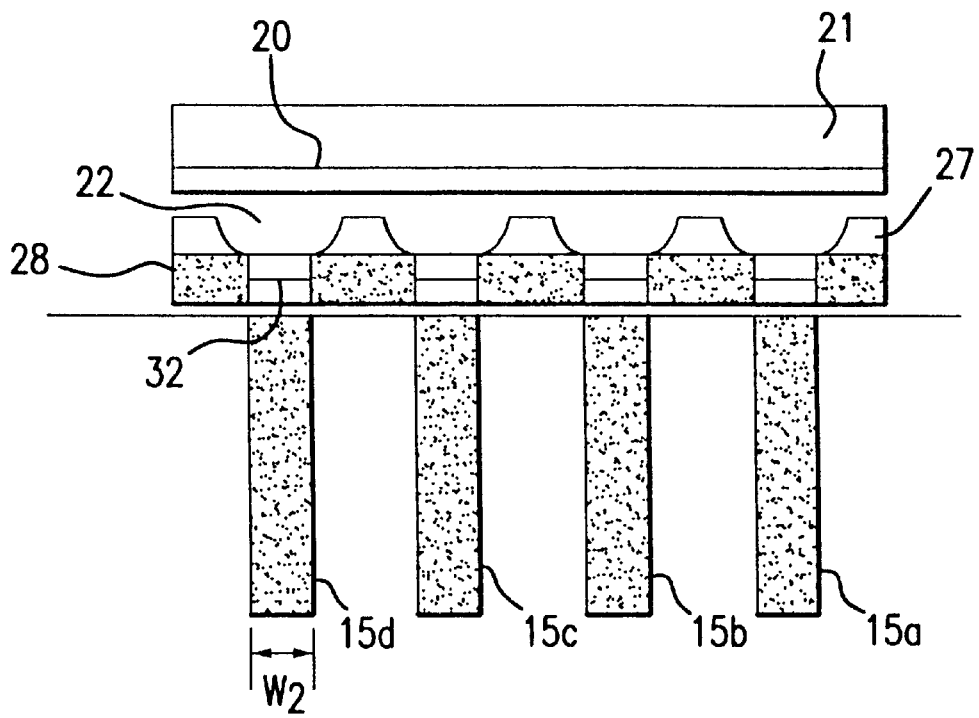
FIG. 4 is a sectional view showing details of a surface emitting type LED light source 26 and a surface emission type AlGaAs alloy quantum well electrooptic absorption modulator 27.

FIG. 3 is a constitutional perspective view showing an arrangement relationship among the surface emitting type LED light source 26, the surface emission type AlGaAs alloy quantum well electrooptic absorption modulator 27, the semiconductor laser beam amplifier 28, the light receiving element array 15 and the optical wave guide path substrate 11. FIG. 4 is a sectional view showing details of the surface emitting type LED light source 26 and the surface emission type AlGaAs alloy quantum well electrooptic absorption modulator 27. A surface emitting type LED light source 26 is an AlGaAs alloy double hetero type LED and numeral 30 designates an activation layer. The surface emission type AlGaAs alloy quantum well electrooptic absorption modulator 27 is constituted by four arrays of optical modulators where activation layers 32 are separated by ion-implanted layers 33. Numeral 31 designates an etched portion for outputting light that is provided at the back face of the substrate of the surface emitting type AlGaAs alloy quantum well electrooptic absorption modulator 27. Incidentally, a width w2 of the wave guide path of each of the optical wave guide paths 19a through 19k is 40 μm, the thickness h of the substrate 11 is 400 μm and a width of the wave guide path of a portion for coupling with the semiconductor laser optical amplifier 28 is 400 μm. However, these dimensions are representative examples. The guide wave width is preferably 200 through 1000 μm.

Figure 5:
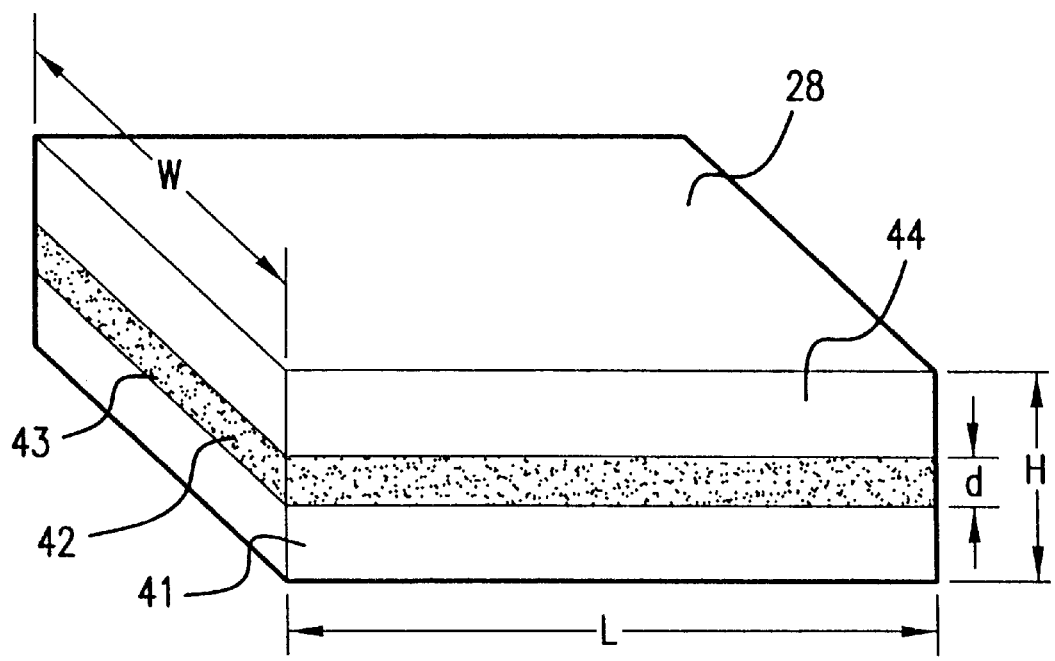
FIG. 5 is a perspective view showing the constitution of a semiconductor laser optical amplifier 28 of FIG. 2.

FIG. 5 is a perspective view showing the constitution of the semiconductor laser beam amplifier 28. The semiconductor laser beam amplifier 28 is constituted by a lower clad layer 41 formed by a liquid phase epitaxy (LPE), an activation region 42 formed by a metal organic vapor epitaxy or a metal organic chemical vapor deposition (MOCVD) or a molecular beam epitaxy (MBE) and an upper clad layer 44 formed by the liquid phase epitaxy (LPE). The activation region 42 includes an activation layer 43 having a quantum well structure. The AlGaAs lower clad layer 41 is formed on a GaAs substrate by LPE, the activation region 42 including the activation layer 43 having the quantum well structure is formed by MOCVD, successively the AlGaAs upper clad layer 44 is formed again by LPE and the GaAs substrate is removed whereby the structure of FIG. 5 is obtained. An epitaxial layer having the thickness of several hundreds μm can be grown by using the LPE. Meanwhile, a fine structure such as a quantum well structure can be formed by MOCVD. Therefore, the semiconductor laser beam amplifier applicable to the GI-POF having the core diameter of 500 μm can be formed by the combination of the two kinds of crystal growth methods. The width W of the semiconductor laser beam amplifier 28 is 500 μm, the length L thereof is 1 through 5 mm and the height H thereof is 500 μm. The thickness of the activation region 42 is 20 μm. However, these dimensions are representative examples. The thickness of the activation region 42 is preferably 5 through 50μ.

Further, the activation region 42 can be constituted by an AlGaInP alloy material. The reason is that a window (region where absorption loss is small) is present in the PMMA alloy plastic optical fiber at a wavelength of around 650 nm and it is preferable to constitute the activation region 42 by the AlGaInP alloy material that is amplifiable at the wavelength of around 650 nm. It is known that the AlGaInP alloy material cannot be grown by the liquid phase epitaxy method since the material is thermodynamically in a quasi-stable state. Therefore, it is a method suitable for fabricating the optical amplifier adaptable to the PMMA alloy plastic optical fiber having a large core diameter of around 0.5 mm that the activation region 42 made of the AlGaInP alloy material is grown by the metal organic vapor epitaxy method or the molecular beam epitaxy method after forming the clad layer, which has the thickness of several hundreds μm, of $Al_xGa_{1-x}As$ (composition range: $0.6 \leq x \leq 0.9$) by the liquid phase epitaxy method.

In FIG. 2, the surface emitting type LED light source 26 corresponds to the spontaneous emission generating means 1 of FIG. 1, the surface emission type AlGaAs alloy quantum well electrooptic absorption modulator 27 corresponds to the optical modulating means 3, the Fresnel lens type diffraction grating 14a corresponds to the optical wavelength band narrowing means 2 and the semiconductor laser beam amplifier 28 corresponds to the optical amplifying means 4, respectively. A light from the surface emitting type LED light source 26 is modulated by the surface emission type AlGaAs alloy quantum well electrooptic absorption modulator 27 which operates as a kind of a spatial modulator and thereafter coupled with the four optical wave guide paths 19a through 19d. Although lights coupled with the respective optical wave guide paths have the same wavelength distribution, they are in states modulated by different signals. The respective optical signals transmitted through the four optical wave guide paths 19a through 19d are divided by a spectrograph formed by the first slab wave guide path 12 and the Fresnel reflecting mirror 14a and coupled with the optical wave guide path 19f. At this moment, only the lights having wavelengths inherent and corresponding to the optical wave guide paths 19a through 19d are coupled with the optical wave guide path 19f from the four optical wave guide paths 19a through 19d. That is, the coupling is carried out such that a light wave having a wavelength λ1 is coupled with the optical wave guide path 19a, a light wave having the wavelength λ2 is coupled with the optical wave guide path 19b, a light wave having the wavelength λ3 is coupled with the optical wave guide path 19c and a light wave having the wavelength λ4 is coupled with the optical wave path 19d. The wavelength multiplexed optical signal from the optical wave guide path 19f is sent to the output optical fiber 20 via the semiconductor laser beam amplifier 28. Incidentally, the output optical fiber 20 may be omitted when the free space optical transmission is carried out.

Embodiment 2

Optical Communication Network

Figure 6:
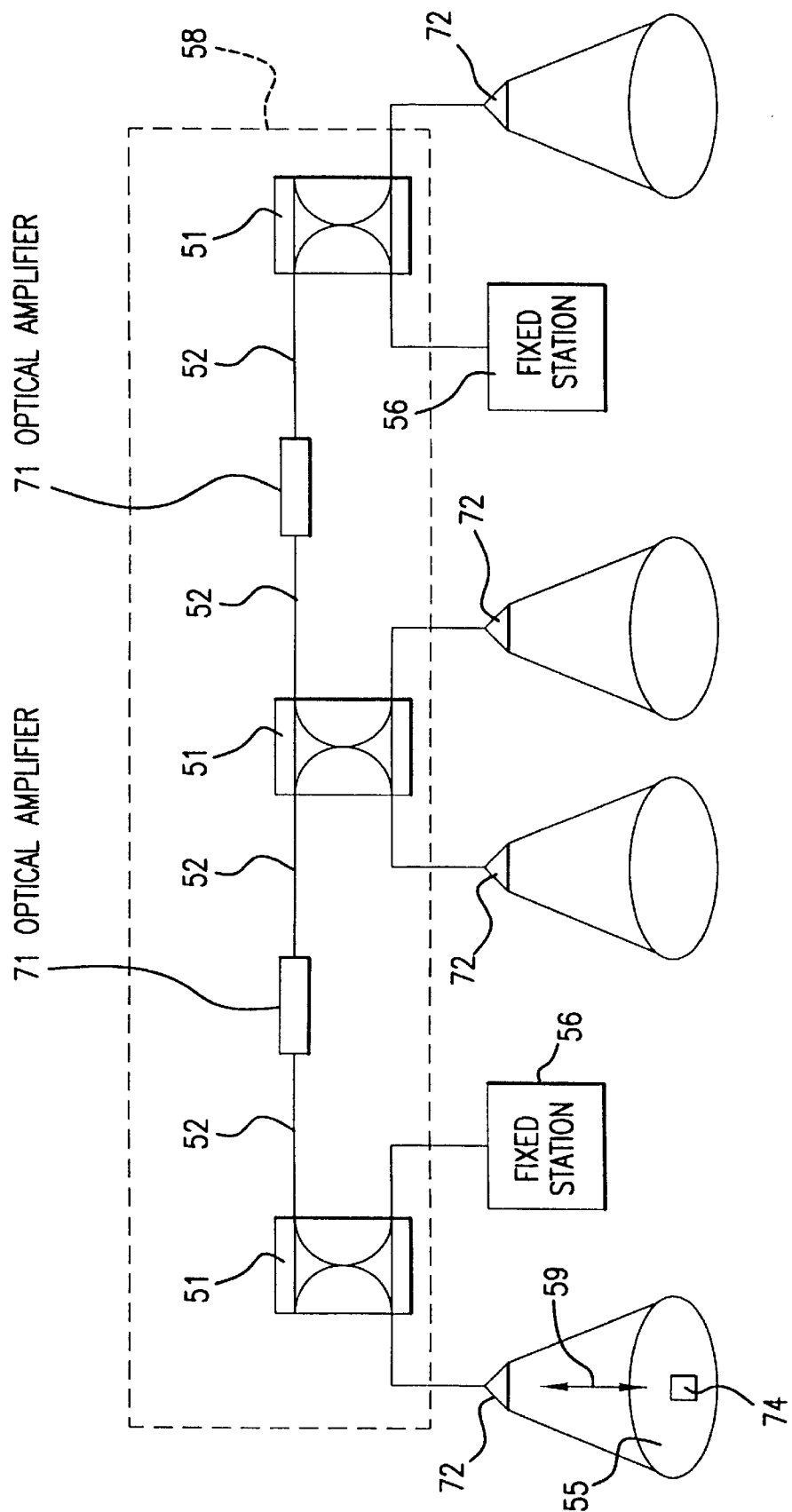
FIG. 6 is an outline view showing an optical communication network according to the present invention.
Figure 32:
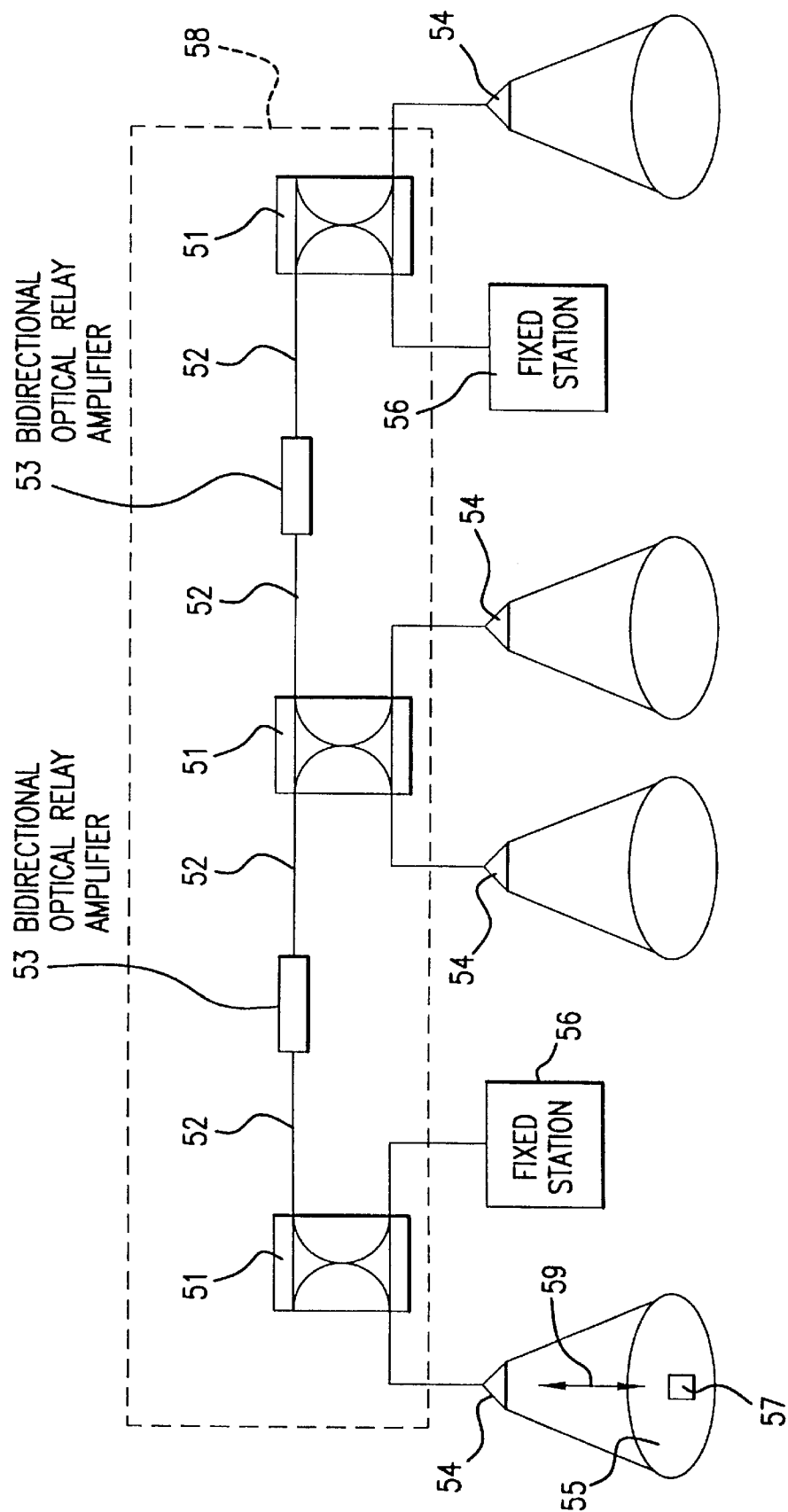
FIG. 32 is an optical network constituting the basis of the present invention.

FIG. 6 shows an optical communication network according to the present invention. The difference between the optical communication network of the present invention and the optical communication network of FIG. 32 resides in that the bidirectional optical relay amplifier is replaced by an optical amplifier 71, the interface unit of the free space optical transmission in respect of the optical fiber is replaced by an optical amplifier 72 and a mobile station is replaced by a mobile station 74 having the optical signal source in accordance with the principle shown by FIG. 1.

Figure 7:
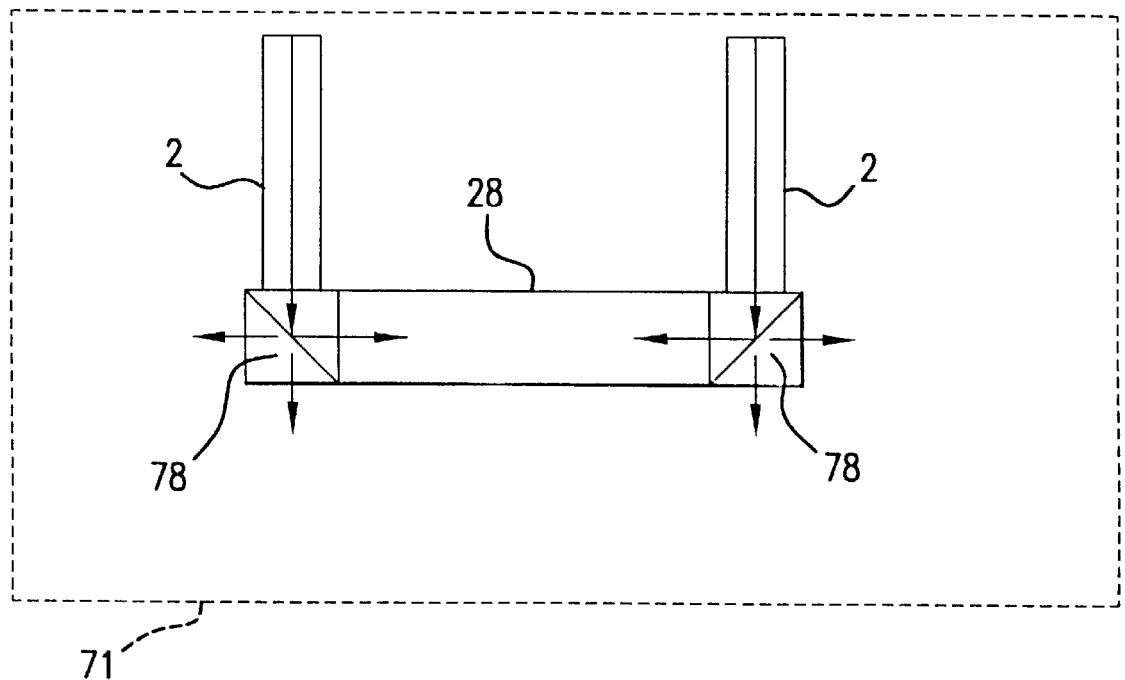
FIG. 7 is an outline view showing the constitution of an optical amplifier 71 of FIG. 6.

FIG. 7 shows the constitution of the optical amplifier 71. The optical amplifier 71 is provided with a structure where the semiconductor laser beam amplifier 28 shown by FIG. 5 is sandwitched by dichroic mirrors 73. A property of the dichroic mirror where a light having a wavelength untransmittable through the dichroic mirror is reflected in other direction, is utilized. The reason is that if interference filters are used in FIG. 7 in place of the dichroic mirrors, the untransmittable light is reflected whereby laser oscillation is caused. Incidentally, the optical fiber 2 is a GI-POF having the core diameter of 500 μm.

Figure 8:
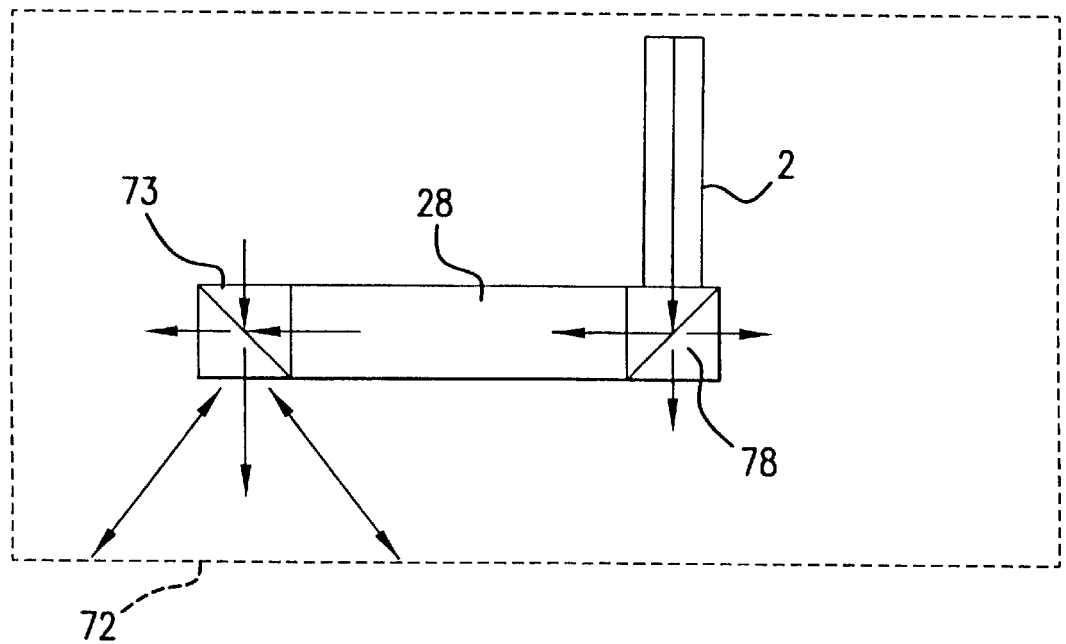
FIG. 8 is an outline view showing the constitution of an optical amplifier 72 of FIG. 6.

FIG. 8 shows the constitution of the optical amplifier 72. The optical amplifier 72 is constituted in line with a conception the same as that in constituting the optical amplifier 71 of FIG. 7. The semiconductor laser beam amplifier 28 is sandwiched by the dichroic mirrors 73. However, directions of the dichroic mirrors are partially different from those in FIG. 7.

Figure 9:
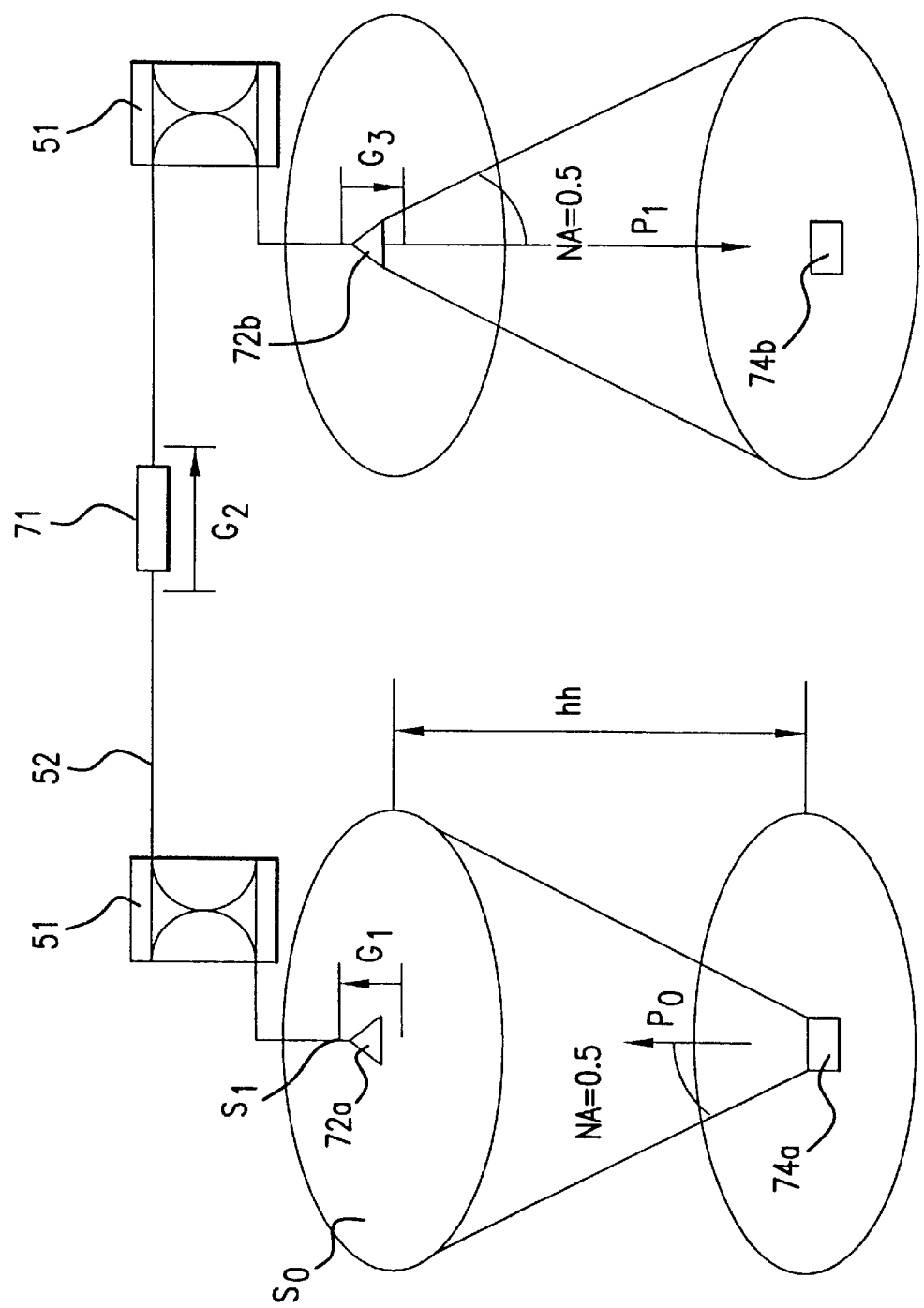
FIG. 9 is an outline view for estimating a gain necessary for each optical amplifier in the optical communication network of FIG. 6.

FIG. 9 is a diagram that is shown for estimating how much gains are necessary for optical relay amplifiers 72a and 72b and the optical relay amplifier 71. Assume a case where the optical relay amplifiers 72a and 70b are installed on a ceiling having, for example, a height hh=3 μm. Assume that the GI-POF having the core diameter of 500 μm and NA=0.5 is adopted for the optical fiber 72. Assume that the free space optical irradiation characteristic of the mobile station 74a is a regular circle having NA=0.5. In this case, an output P0 from the mobile station 74a which is finally outputted from the optical relay amplifier 72b becomes an output P1 which is outputted via the optical relay amplifiers 72a, 71 and 72b, the star couplers 51, the optical fiber 52 and the like.

Here, assume a case where P0=P1 as an example of the gain distribution in the network relay. The output P0 from the mobile station 74a is diverged to an area S0=(hh·NA)2×π=(1.5 m)2×3.14=7.07 m2. Meanwhile, a light receiving area S1 of the optical relay amplifier 72a is considered to be equal to that of the GI-POF having the core diameter of 500 μm and therefore, S1=(0.5 mm/2)2×π=0.196 mm2. From the above-described assumptions, the received optical power of the optical relay amplifier 72a is P0S1/S0. As mentioned above, P0=P1 and therefore, the necessary total gain is calculated as G=P0/P1=S0/S1=7.07 m2/0.196 mm2=3.6× 107=76 dB when the losses for inserting the star couplers 51, the optical fiber 52 and the like are disregarded. When the losses of inserting the star couplers 51, the optical fiber 52 and the like are estimated as 15 dB, the necessary gain becomes 90 dB, which may be distributed to the optical relay amplifiers 72a, 71 and 72b respectively as gains G1, G2 and G3. The gains may be specified as G1=G2=G3=30 dB as an example.

According to the embodiments described above, all the relay amplifiers can be formed by optical amplifiers and therefore, the optical communication network having an extremely high speed can be constituted.

Embodiment 3
Wireless Communication Optical Transceiver

Figure 10A:
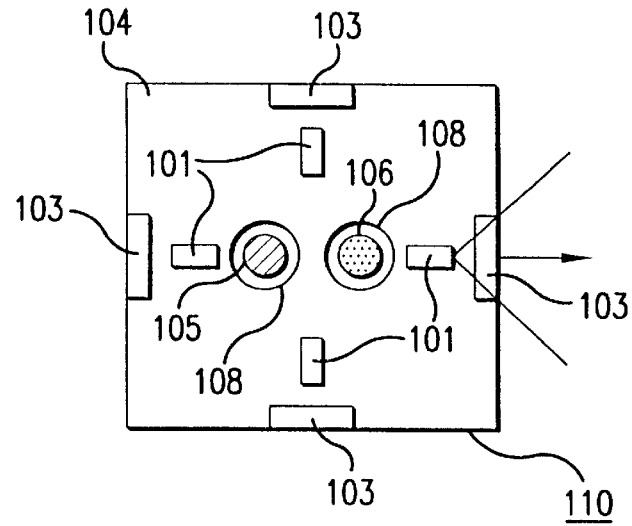
FIGS. 10A and 10B are a top view and a side view, respectively, showing wireless communication optical transceiver according to a third embodiment.
Figure 10B:
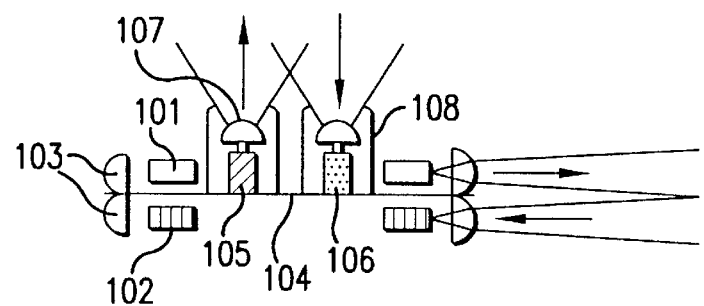

FIGS. 10A and 10B show a wireless communication optical transceiver 110 according to a third embodiment of the present invention. FIGS. 10A and 10B are a top view and a side view of the wireless communication optical transceiver 110.

As shown in FIG. 10B, light sources 101 for radiating free space light horizontally and photodetecting elements 102 for receiving free space light that comes horizontally are provided above and below a partition plate 104, respectively. Each of the light sources 101 and photodetecting elements 102 is provided with a cylindrical lens 103. Four light sources 101 and four photodetecting elements 102 are provided to cover the four horizontal directions. Therefore, there are eight cylindrical lenses 103 in total. In this specification, the optical system consisting of the light sources 101, the photodetecting elements 102 and the cylindrical lenses 103 is called "horizontal radiation system". The horizontal radiation system is mainly used for communication between mobile terminals (mobile stations).

An optical system consisting of a light source 105, a photodetecting element 106, lenses 107 and light shielding pipes 108 is provided above the partition plate 104. This optical system serves for transmission and reception of free space light in the vertical direction, and is called "vertical radiation system". The vertical radiation system is mainly used for a link between the mobile terminals and backbone network.

Each of the light sources 101 and 105 is an AlGaAs-type LED having an emission wavelength 850 nm. Each of the photodetecting elements 102 and 106 is a Si-PIN photo-diode. The partition plate 104 and the light shielding pipes 108 are made of plastics and are painted black to prevent transmission light from going into the receiving side.

Figure 11:
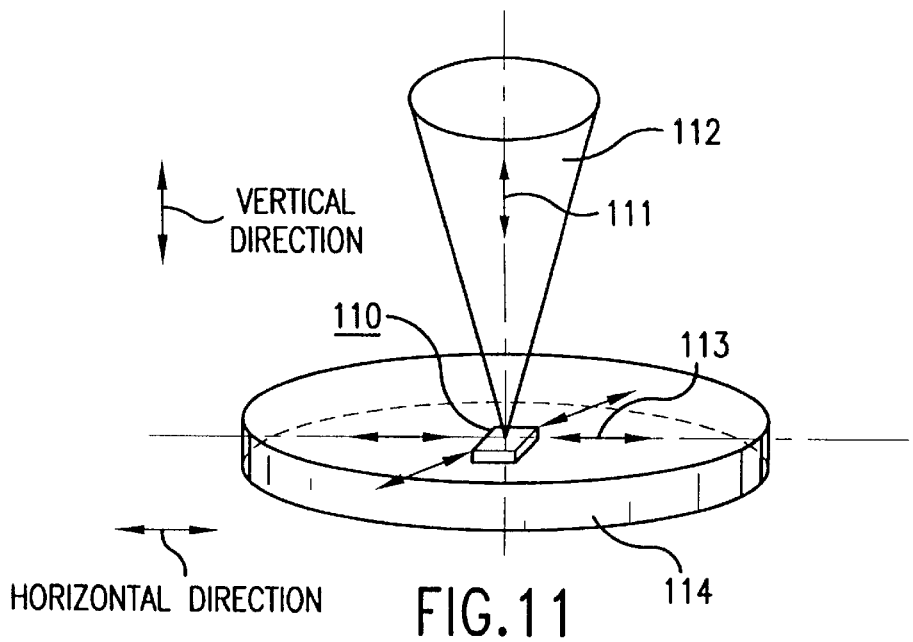
FIG. 11 schematically illustrates directivity characteristics of a transmission and reception signal light beam of the wireless communication optical transceiver.

FIG. 11 schematically illustrates directivity characteristics of transmission and reception signal light beams of the wireless communication optical transceiver 110. In FIG. 11, an optical signal 111 of the vertical radiation has a conical directivity characteristic 112. Meanwhile, an optical signal 113 of the horizontal radiation system has a discoid directivity characteristic 114. As described later, the light signal 111 of the vertical radiation system is used for communication with the backbone network, and the optical signal 113 of the horizontal radiation system is used for communication between the mobile terminals (mobile stations) and detection of a collision between adjacent mobile terminals (mobile stations).

Figure 12:
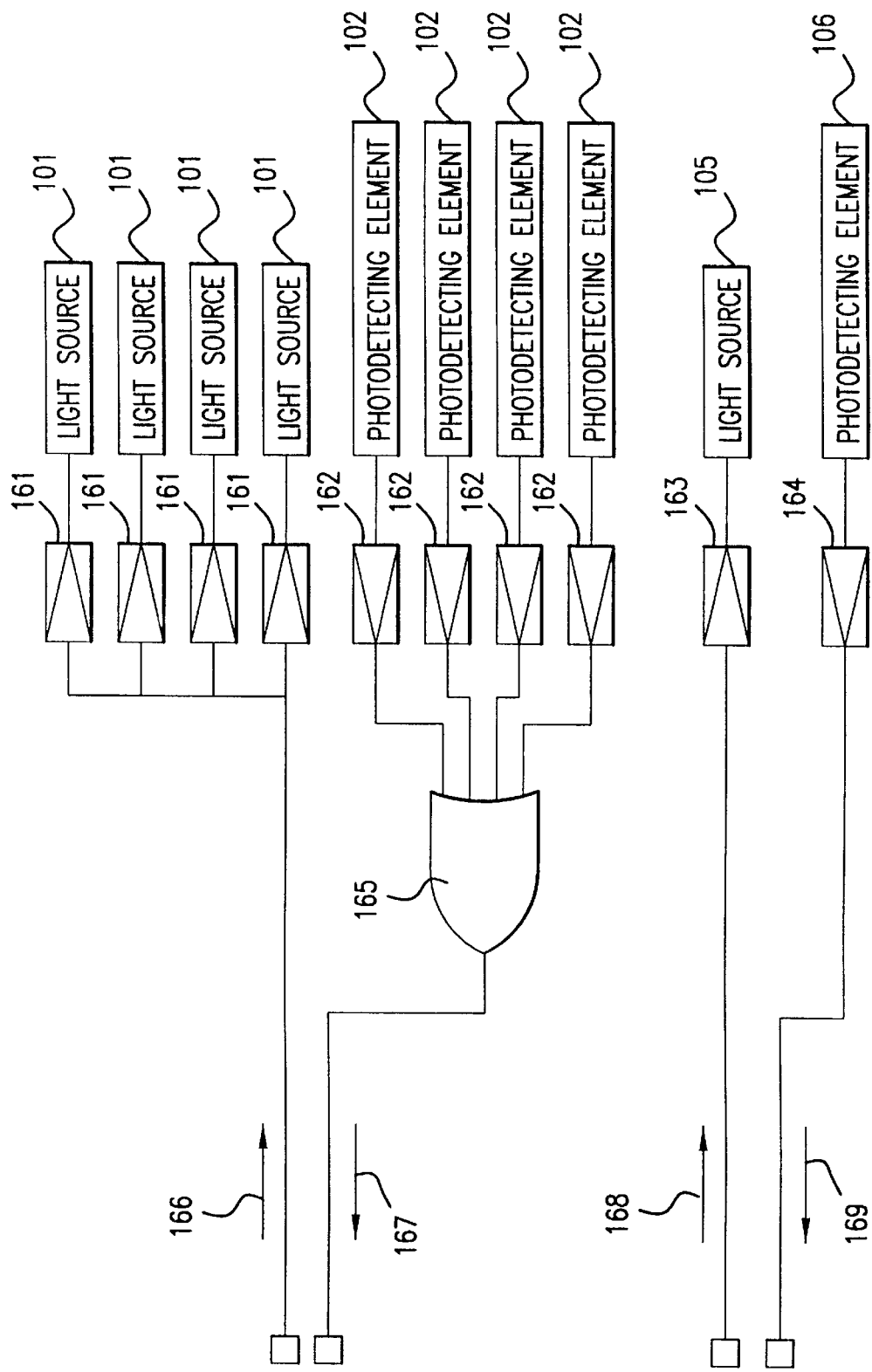
FIG. 12 is a block diagram illustrating a circuit configuration of the wireless communication optical transceiver.

FIG. 12 is a block diagram illustrating a circuit configuration of the wireless communication optical transceiver 110. As described above, the wireless communication optical transceiver 110 has two transmission and reception systems, that is, a horizontal radiation system and a vertical radiation system.

In FIG. 12, a transmission signal 166 of the horizontal radiation system is transmitted to light source drive circuits 161 to drive the light source (AlGaAs-type LED) 101. One light source drive circuit is provided for each of four light sources 101. Free space light signals received by the four photodetecting elements 102 are amplified and reshaped by amplifiers 162, passes through an OR circuit 165, and become a reception signal 167 of the horizontal radiation system. A transmission signal 168 of the vertical radiation system is transmitted to a light source drive circuit 163 to drive the light source (AlGaAs-type LED) 105. A free space light signal received by the photodetecting element 106 is amplified and reshaped by the amplifier 164 and becomes a reception signal 169 of the vertical radiation system. Signals 166, 167, 168, 169 are used for communication with the host mobile computer.

In this embodiment, the horizontal radiation system consists of four light sources and four photodetecting elements, but they are not limited to four. It can consist of arbitrary plural light sources and photodetecting elements.

Additionally, the light source of the first embodiment can be used for the light source of this embodiment.

Embodiment 4
Wireless Communication Optical Transceiver

Figure 13:
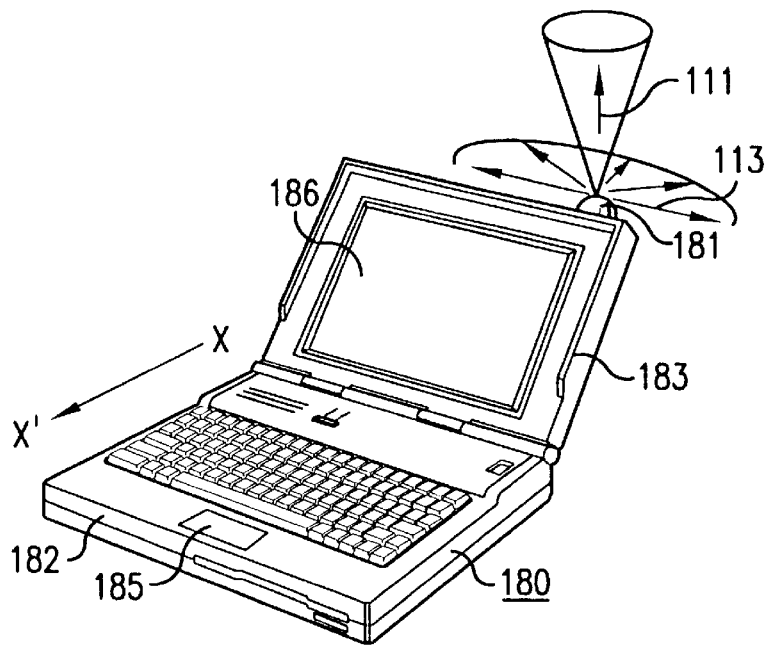
FIG. 13 is a perspective view of a note-type personal computer provided with a wireless communication optical transceiver according to a fourth embodiment.
Figure 14A:
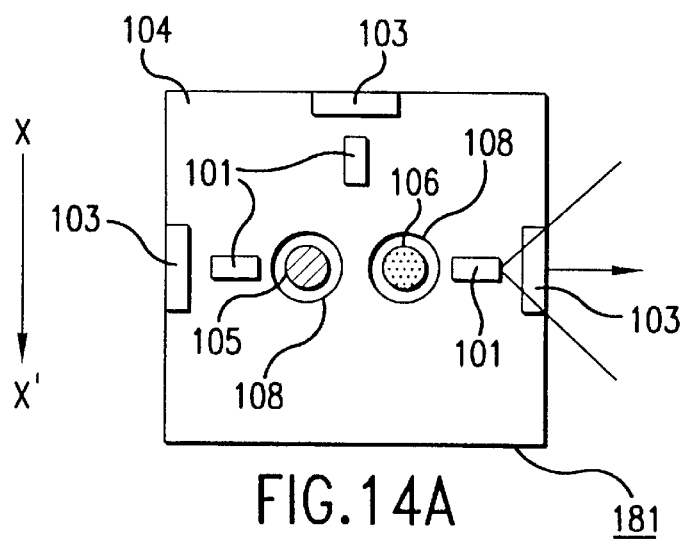
FIGS. 14A and 14B illustrate a top view and side view, respectively, showing a wireless communication optical transceiver the fourth embodiment.
Figure 14B:
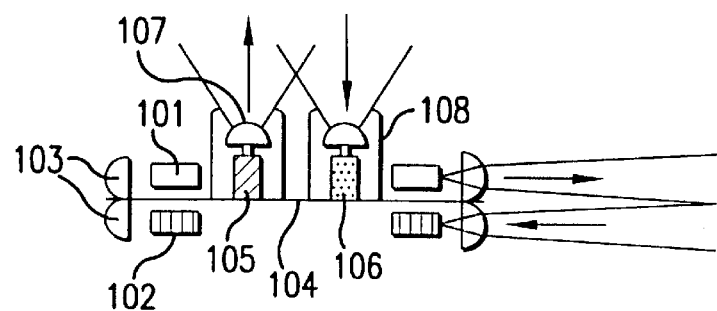

FIGS. 13, 14A and 14B illustrate a wireless communication optical transceiver according to a fourth embodiment of the present invention. This wireless communication optical transceiver is suitable for fitting with mobile terminals, such as note-type personal computers. In FIG. 13, the note-type personal computer 180 consists of body base part 182 and body cover part 183, and can be folded up. The body base part serves a keyboard 184 and a trackball 185. The body cover part is provided with a display 186 and a wireless communication optical transceiver 181 of this embodiment. The wireless communication optical transceiver is attached above the body cover part 183.

Figure 15:
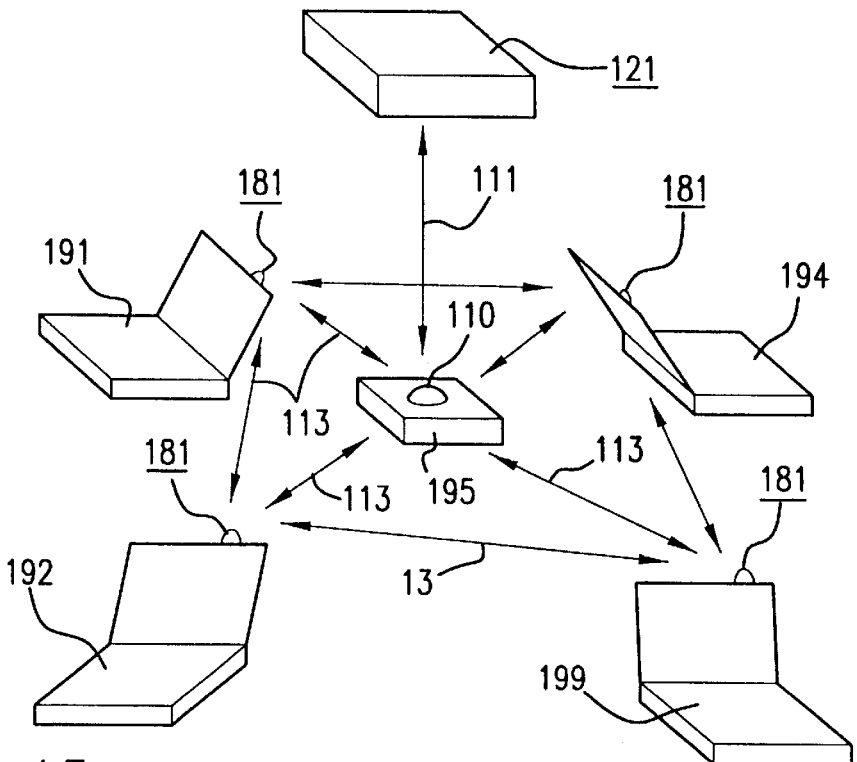
FIG. 15 is a perspective view illustrating that a note-type personal computer a backbone network via a proxy server.

FIGS. 14A and 14B illustrates an optical system of the wireless communication optical transceiver 181 of this embodiment. FIGS. 14A and 14B are the counterpart of FIGS. 10A and 10B in the third embodiment. This wireless communication optical transceiver is different from that of FIG. 10A and 10B in that only three light sources 101 and a cylindrical lenses are provided. A light source 101 and a cylindrical lens 103 for the side where the user sits, that is the side of the direction from X to X' shown in FIGS. 14A, 14B and 15, are omitted. There are two reasons therefor. The first is that the light signal radiated to the side of the direction from X to X' is shielded by the user, because the user always sits on this side during ordinary operations. The second is that the light radiated to the user side is applied to the user's eyes, and may damage the user's eyes. In FIGS. 14A and 14B, the corresponding parts to FIGS. 10A and 10B are referred the same numbers, and detailed explanation is omitted.

Figure 16:
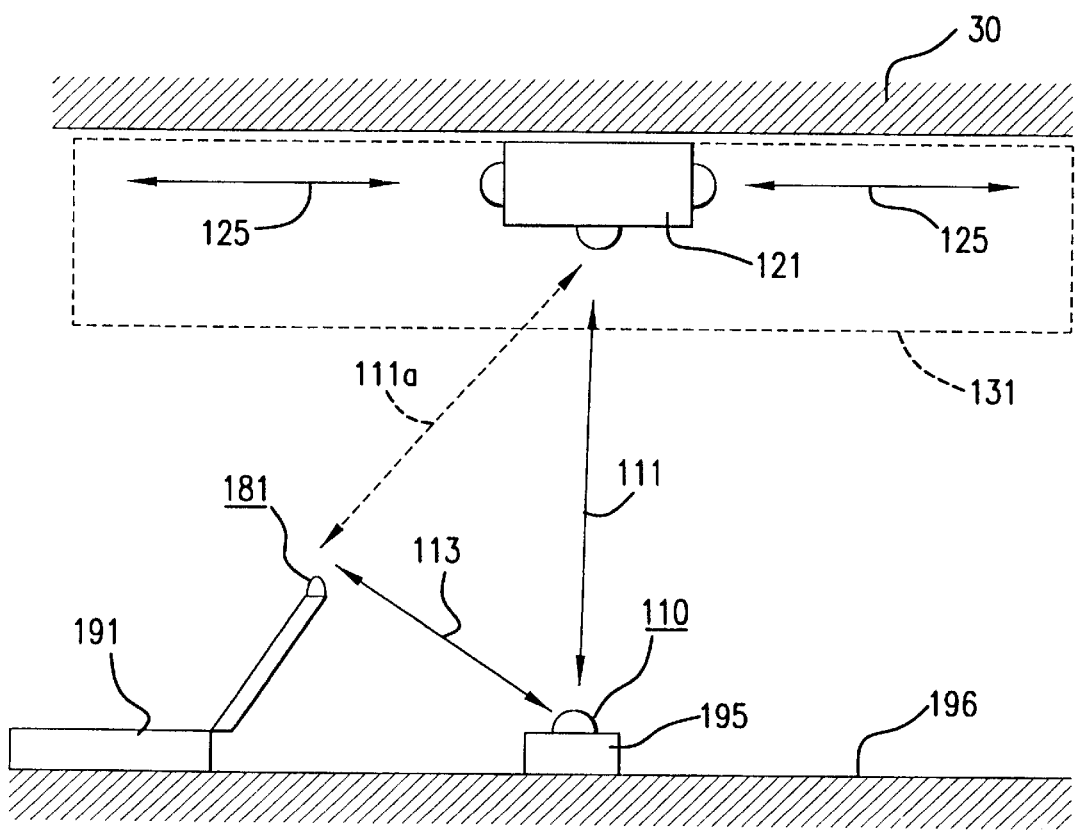
FIG. 16 is a schematic side view corresponding to FIG. 15.

Next, utilization of the wireless communication optical transceiver of the present invention is explained with reference to FIGS. 15 and 16. FIG. 15 shows note-type personal computers 191 through 194 each of which is provided with a wireless communication optical transceiver 181 of the fourth embodiment. Reference numeral 195 is a proxy server provided with a wireless communication optical transceiver 110 of the third embodiment. Reference numeral 121 is an active star coupler, which is explained later in detail. The active star coupler 121 is linked with the other star couplers 121 by means of free space light to form a backbone network 131. This backbone network 131 is explained later in detail. The note-type personal computers 191 through 194 and the proxy server 195 are on a desk 196. The active star coupler 121 is set near a ceiling 130.

The note-type personal computer 191 though 194 communicate each other by means of horizontal radiation light beams 113. The note-type personal computer 191 communicates with the backbone network 131 via the proxy server 195. The note-type computer 191 communicates with the proxy server by means of the horizontal radiation light beam 113, and the proxy server 195 links to the backbone network 131 by means of a vertical radiation light beam 111. That is, the proxy server 195 relays between the note-type personal computer 191 and the backbone network 131. A note-type personal computer 191 can be linked directly to the backbone network 131 by means of vertical radiation light beam 111a.

The proxy server 195 has the following two applications. The first is that when the note-type personal computer 191 is placed where it cannot be linked directly to the backbone network 131, the proxy server 195 relays signals among them. The second is that the proxy server 195 is provided with a function of a bridge or a router. Since signal traffic of the backbone network 131 is prevented from directly carrying into note-type personal computers 191 through 194, the burden of the note-type personal computers, whose information processing abilities are limited, can be decreased.

Figure 17A:
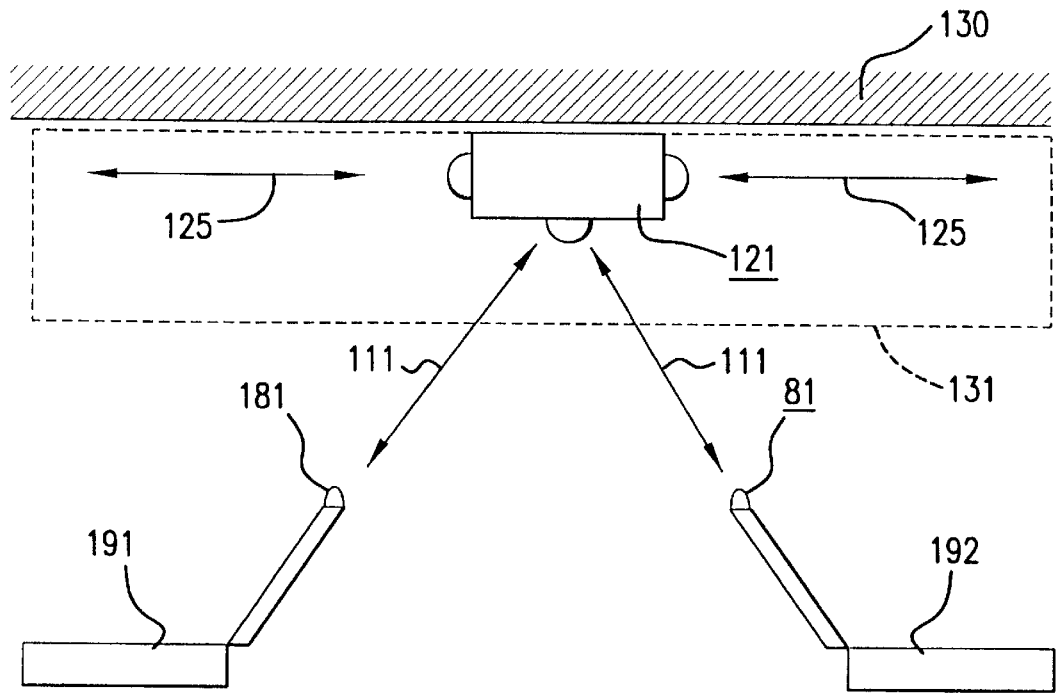
FIGS. 17A and 17B are schematic side views illustrating that a note-type personal computer links to the backbone network are linked via a proxy server.
Figure 17B:
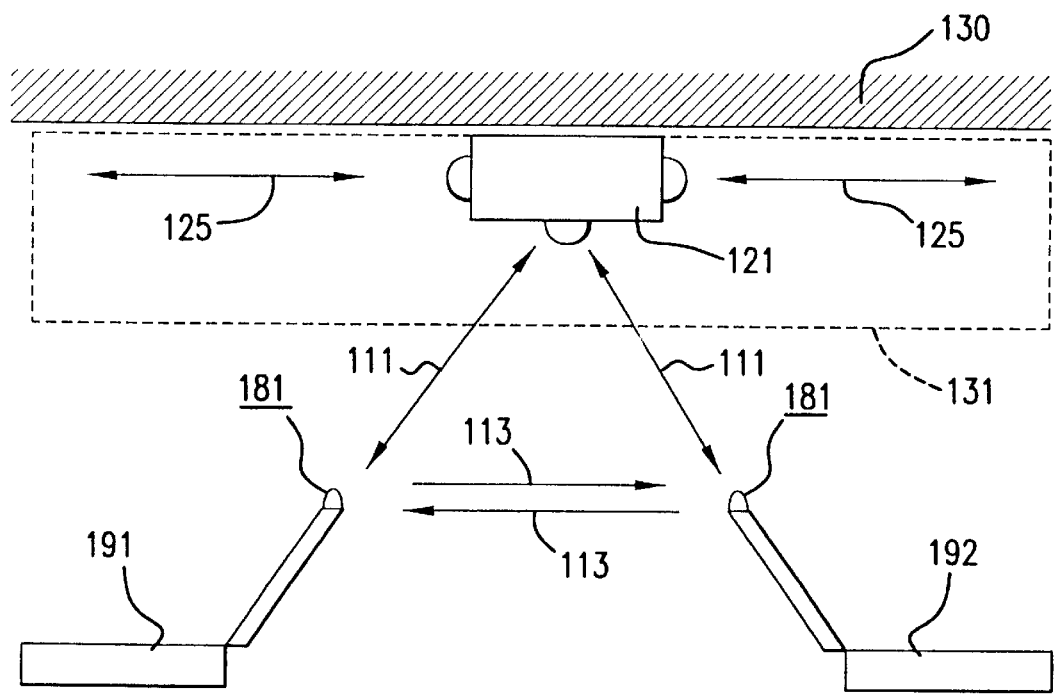

The above-described wireless communication optical transceivers according to the third and fourth embodiments have a function to ensure collision detection. This is explained with reference to FIGS. 17A and 17B. In FIGS. 17A and 17B, to be linked to the backbone network 131, note-type personal computer 191 or 192 transmits a signal to the active star coupler 121, which is set near the ceiling 130, by using the vertical radiation system. But when note-type personal computers 191 and 192 are placed close to each other and light beam signals are transmitted only by the vertical radiation system as shown in FIG. 17A, collision cannot be detected. When note-type computers 191 and 192 transmit light beam signals only by the vertical radiation system almost at the same time, one cannot know that another transmits a signal. Meanwhile, as shown in FIG. 17B, they transmit light beam signals by both the vertical radiation system and the horizontal radiation system, one can know the other signal transmission. Accordingly, collision can be detected. This is a profit of the wireless communication optical transceiver of the present invention, which are provided with the horizontal radiation system and the vertical radiation system.

When contents of the transmission of the horizontal radiation system is the same as that of the vertical radiation system, communication succeeds even if the transceiver is in the same cell. Meanwhile, only a simple jamming signal can be transmitted by the horizontal radiation system. In this case, only collision detection is ensured.

Embodiment 5
Active Star Coupler

Figure 18A:
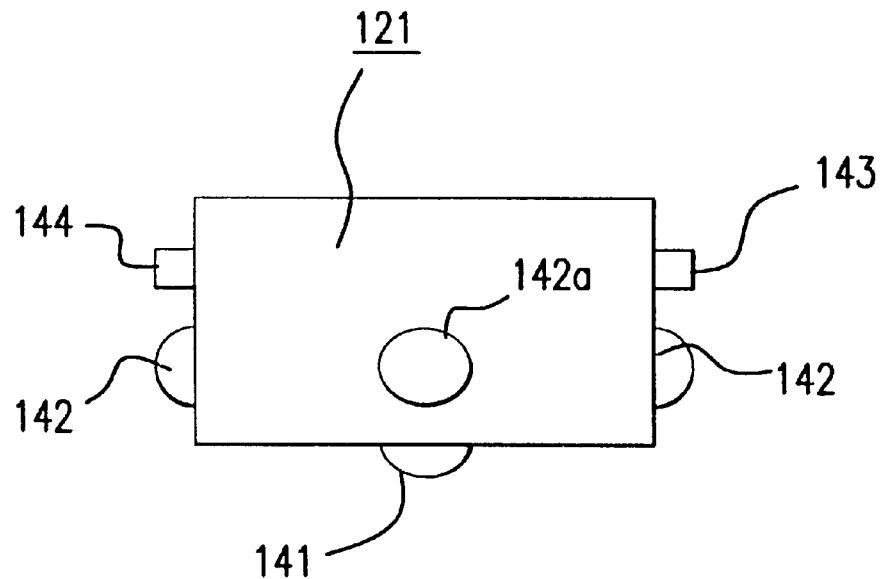
FIGS. 18A and 18B show a side view and a bottom view, respectively, showing an active star coupler a fifth embodiment of the present invention.
Figure 18B:
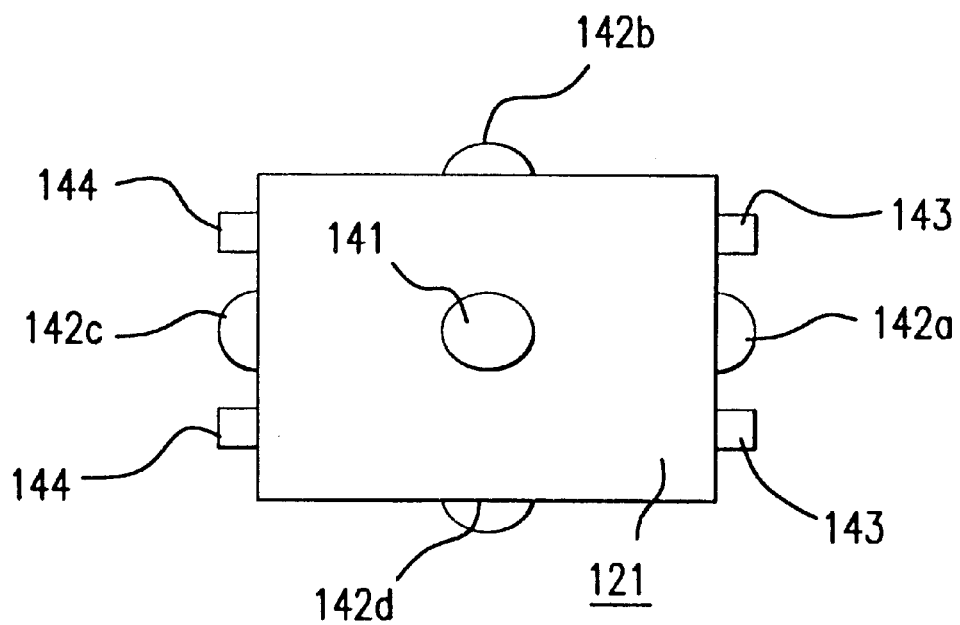

FIGS. 18A and 18B illustrate an active star coupler 121 according to a fifth embodiment of the present invention. FIGS. 18A and 18B are a side view and a bottom view of the active star coupler 121, respectively. A free space optical transmission and reception port 141 is provided at the bottom of the active star coupler 121. A free space optical transmission and reception port 142 is provided at each side of the active star coupler. Therefore, there are four free space optical transmission and reception ports in total to cover four horizontal directions. One side of the active star coupler 121 has two optical fiber ports 143. Another side of the active star coupler 121 has two twisted pair cable ports 144.

FIG. 19 is a circuit diagram showing an internal configuration of the active star coupler shown in FIGS. 18A and 18B. Note that the circuit diagram shown in FIG. 19 includes both an electric system and an optical fiber system. In FIG. 19, lines 147, which connect optical fiber ports 143a and 143b to a matrix circuit 140, are optical fibers. Lines 148, which connect twisted pair cable ports 144a and 144b to the matrix circuit 140, are electric wires. Lines 149, which connect free space optical transmission and reception ports 141, 142a, 142b, 142c and 142d to the matrix circuit 140, are also electric wires.

Figure 20:
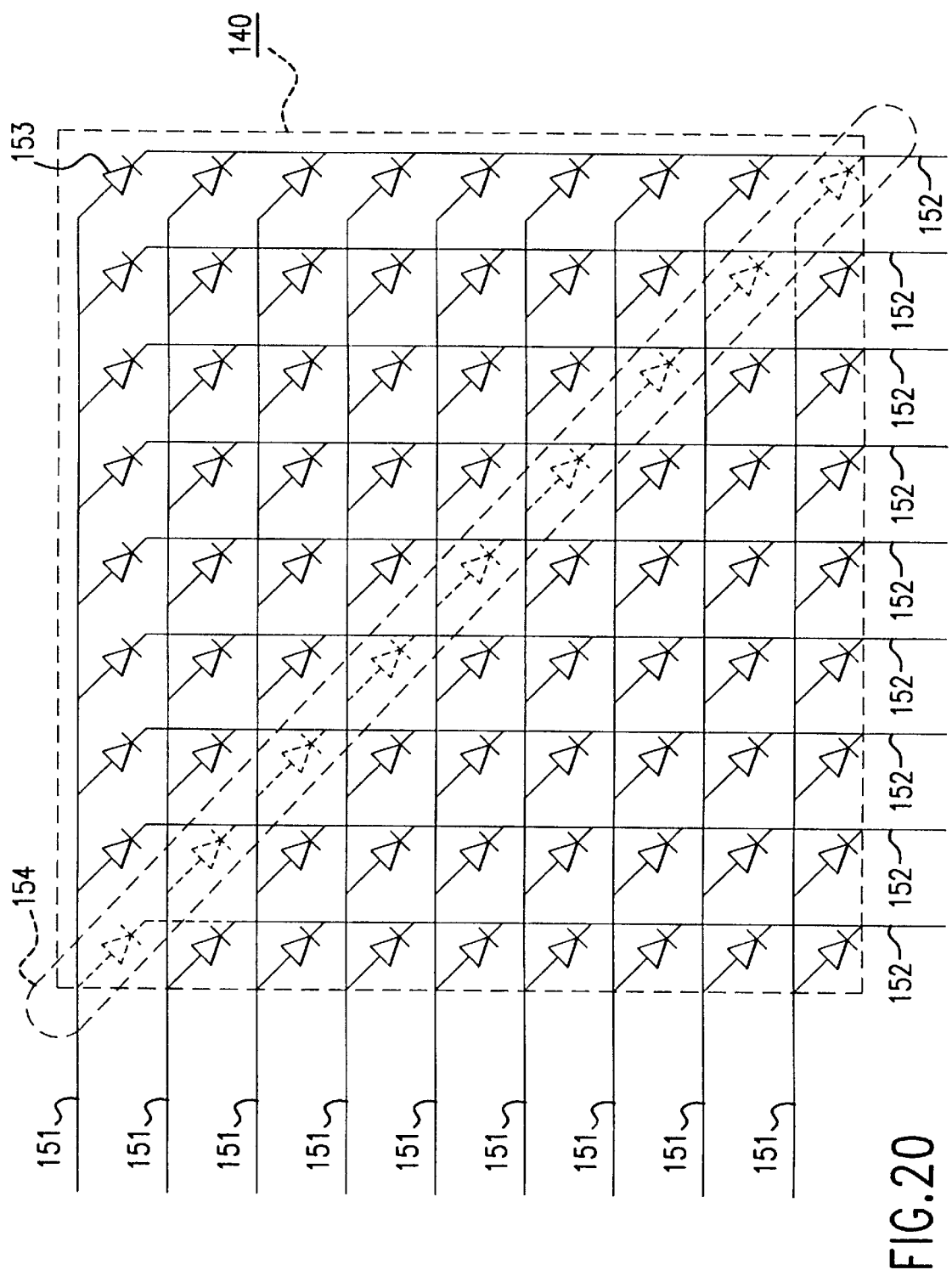
FIG. 20 is a circuit diagram illustrating an internal configuration of a matrix circuit of FIG. 19.

FIG. 20 shows an internal configuration of the matrix circuit 140. The matrix circuit 140 consists of input ports 151, output ports 152 and diodes 153, which connects the input ports and the output ports. The diagonal part 154 of the matrix has no diode to obtain the transfer characteristic in which all diagonal elements are zero. FIG. 20 uses a diode matrix in which all diagonal elements are zero to obtain the transfer characteristic. But, any other gate circuit configuration can be adopted instead of the diode matrix.

In FIG. 19, the matrix circuit 140 is disposed between input side frontend amplifiers 145 and output drive circuits (driver amplifiers) 146. Each of the free space optical transmission and reception ports 141 and 142a through 142d is provided with a photodetector 155 and a light source 156. Similarly, each of the optical fiber ports 143a and 143b is provided with a photodetector 155 and a light source 156 in the same way. Each optical fiber port is has an optical coupler 150.

A free space light received by the free space optical transmission and reception port 141 is converted to a electric signal, is amplified by an amplifier R3 in the frontend amplifiers 145, passes though the matrix circuit 140 and the output drive circuits 146, and then is relayed to the free space optical transmission and reception port 142a through 142d, optical fiber ports 143a and 143b, and twisted pair cable ports 144a and 144b. Notice that the signal received by the free space optical transmission and reception port 141 does not return to the free space optical transmission and reception port 141 itself.

A free space light beam received by the free space optical transmission and reception port 142a is converted to an electric signal by a photodetector (no figure) provided in the free space optical transmission and reception port 142a, is amplified by the amplifier R3 in the frontend amplifiers 145, passes through the matrix circuit 140 and output the drive circuits (driver amplifiers) 146, and then is relayed to the free space optical transmission and reception port 141, and 142b through 142d, the optical fiber ports 143a and 143b, and twisted pair cable ports 144a and 144b. The signal received by the free space optical transmission and reception port 142a does not return to the free space optical transmission and reception port 142a itself.

A signal light beam (guided light wave) received by the optical fiber port 143a is converted into an electric signal by the photodetector 155, is amplified by an amplifier R1 in the frontend amplifiers 145, passes through the matrix circuit 140 and the output drive circuits (driver amplifiers) 146, and then is relayed to the free space optical transmission and reception port 141 and 142a through 142d, the optical fiber port 143b, and the twisted pair cable ports 144a and 144b. The signal received by the optical fiber port 143a does not return to the optical fiber port 143a itself.

An electric signal received by the twisted pair port 144a is amplified by an amplifier R2 in the frontend amplifiers 145, passes through the matrix circuit 140 and the output drive circuits (driver amplifiers) 146, and then is relayed to the free space optical transmission and reception port 141 and 142a through 142d, the optical fiber ports 143a and 143b, and the twisted pair cable port 144b. The signal received by the twisted cable port 144a does not return to the twisted cable port 144a itself.

Embodiment 6
Communication Network

Figure 21:
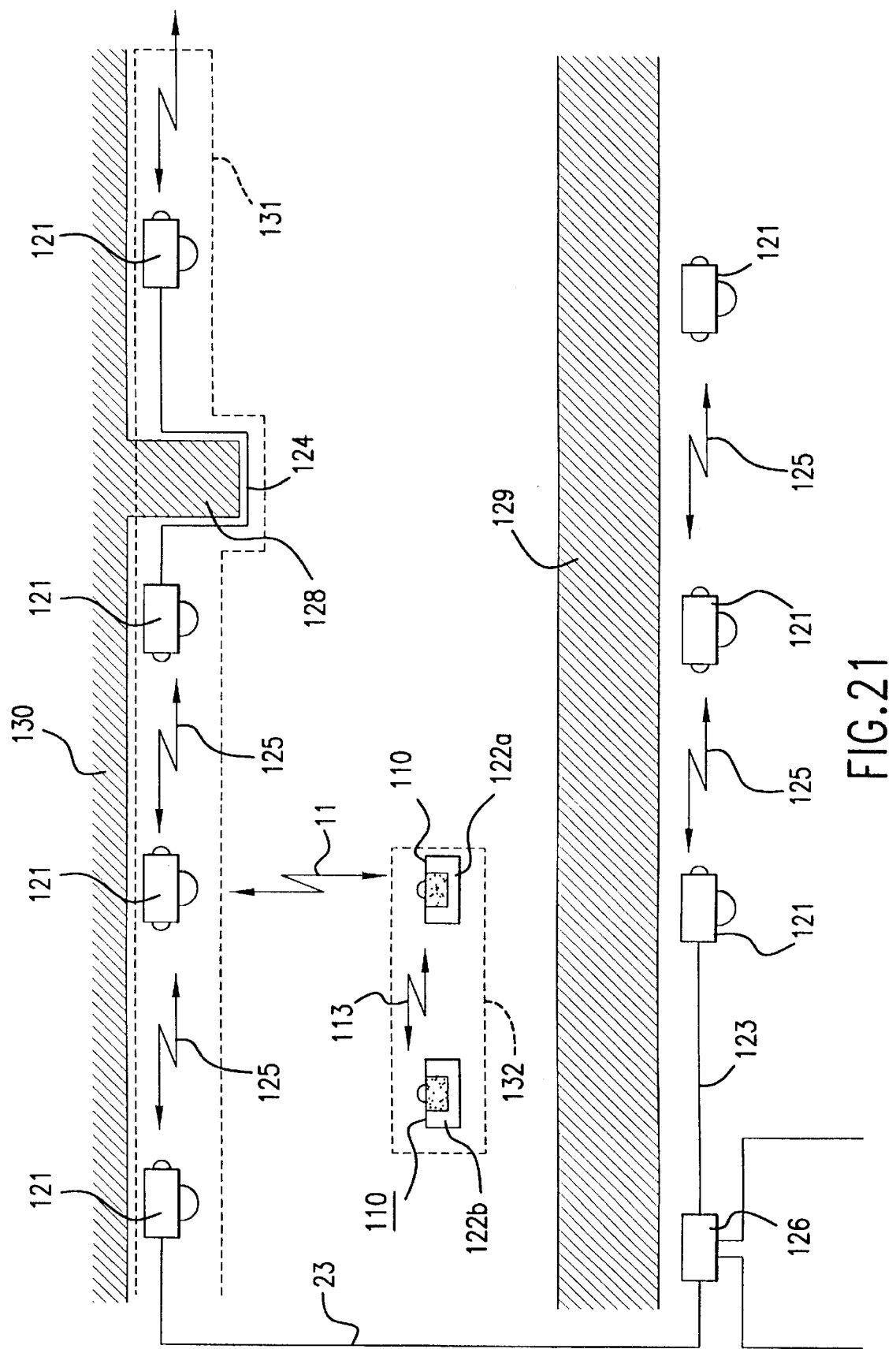
FIG. 21 is a side view of a communication network according to a sixth embodiment of the present invention.

FIG. 21 shows a communication network according to a sixth embodiment of the present invention. A backbone network 131 includes plural above-described active star couplers 121 which are connected each other by means of a free space light beam 125, an optical fiber 123 or a twisted pair cable 124. Mobile terminals (mobile stations) 122a and 122b, each of which is provided with the above-described wireless optical transceiver 110, communicate each other by means of a horizontal radiation light beam 113, and communicate with the backbone network 131 by means of a vertical radiation light beam 111. Note-type personal computers 191 and 192 each of which is provided with the above-described wireless optical transceiver 181, can be used instead of the mobile terminals (mobile stations) 122a and 122b.

Figure 31:
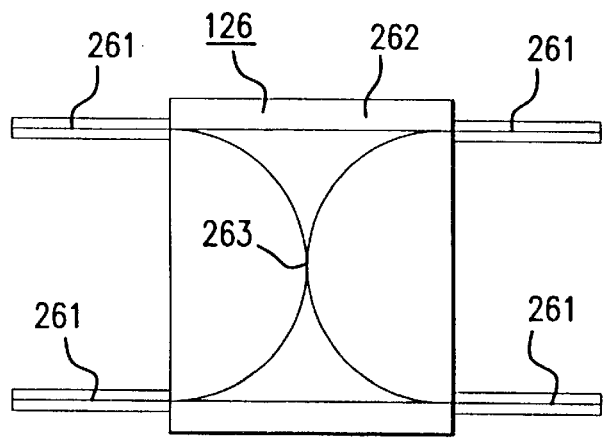
FIG. 31 schematically illustrates a conventional interconnectable passive star coupler disclosed in Hei. 5-3457.

In the configuration of the backbone network 131, the active star couplers 121 which are posted where they are visible each other, are connected by means of the free space light beam 125. If there is an obstacle 128 between star couplers 121, they are connected by the twisted pair cable 124 so as to go around the obstacle 128. To connect to an star coupler in downstairs, a optical fiber 123 is used, for example. A passive star coupler 126 can be used in the network rather than the active star coupler 121. The passive star coupler 126 has a configuration shown in FIG. 31 described above. In FIG. 22, reference numerals 129 and 130 are a floor and a ceiling, respectively. Since both the active star coupler 121 and passive star coupler 126 are interconnectable star couplers, oscillation does not occur in the network.

Embodiment 7
Wireless Communication Optical Transceiver

Figure 22A:
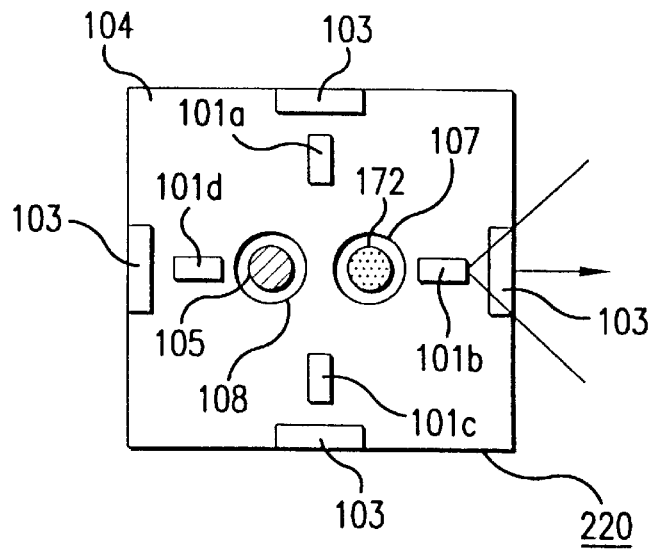
FIGS. 22A and 22B illustrate a top view and a side view, respectively, showing a wireless communication optical transceiver according to a seventh embodiment of the present invention.
Figure 22B:
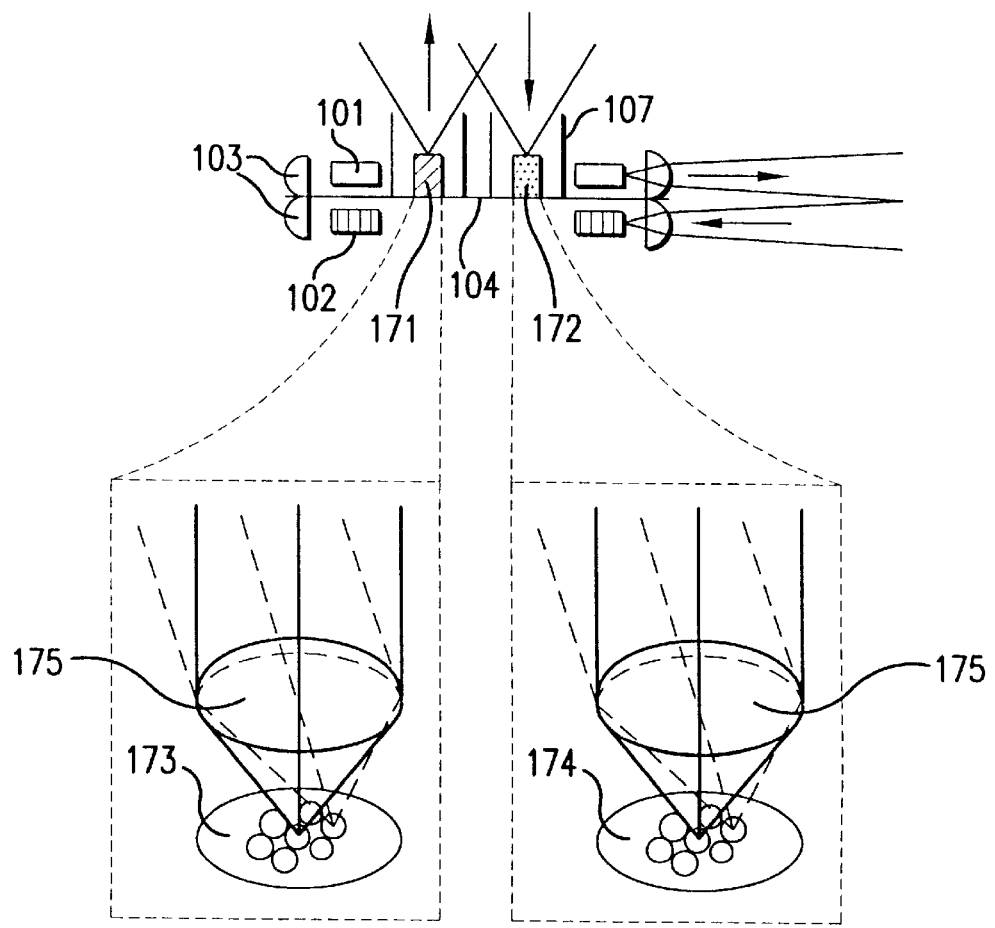
Figure 23A:
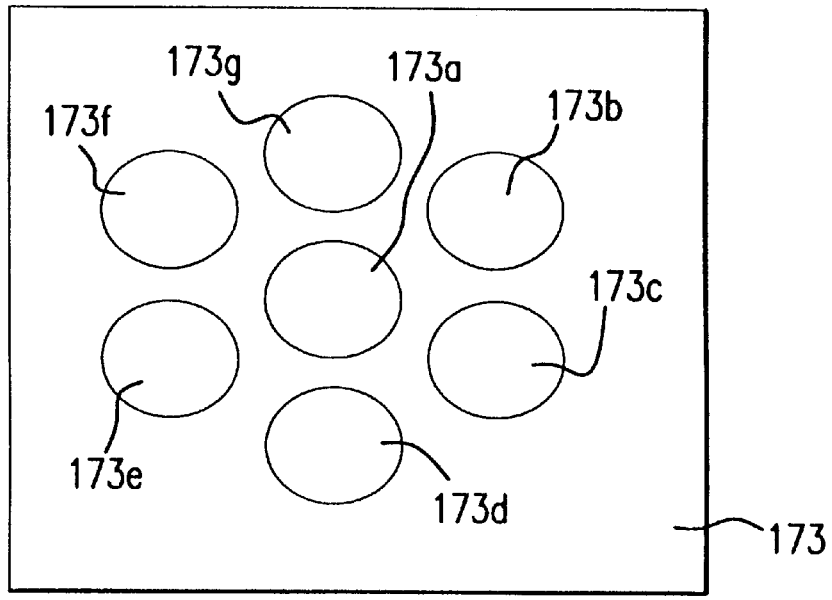
FIGS. 23A and 23B illustrate top views of a light source array and a photodetecting element array, respectively.
Figure 23B:
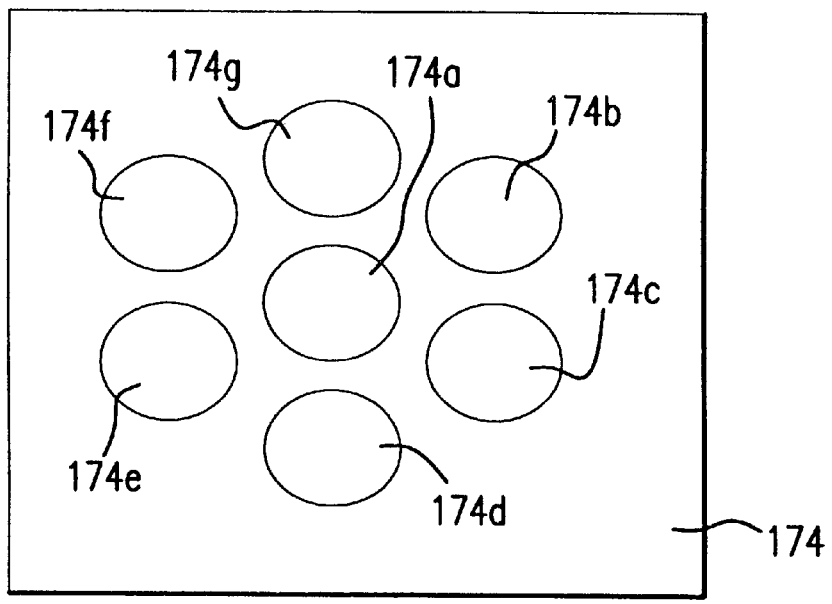

FIGS. 22A and 22B show a wireless communication optical transceiver according to the seventh embodiment of the present invention. This wireless communication optical transceiver is different from that of the third embodiment in that the horizontal and vertical radiation systems adopt a spatial diversity. The horizontal radiation system are provided with four light sources 101a through 101d and four photodetecting elements 102a through 102d as in the third embodiment, but they are not simply connected in parallel but are used by switching in accordance with circumstances, as explained in later. The vertical radiation system are provided with a light source unit 171 and a photodetector unit 172. The light source unit 171 consists of a light source array 173 and a lens 175. The photodetector unit 172 consists of a photodetecting element array 174 and a lens 175. The light source array 173 is an array consisting of seven light sources (AlGaAs-type LED of wavelength 850 nm) 173a through 173g, as shown in FIG. 23A. The photodetecting element array 174 is an array consisting of seven photodetecting elements (Si-PIN-PD) 174a through 174g, as shown in FIG. 23B.

Figure 24:
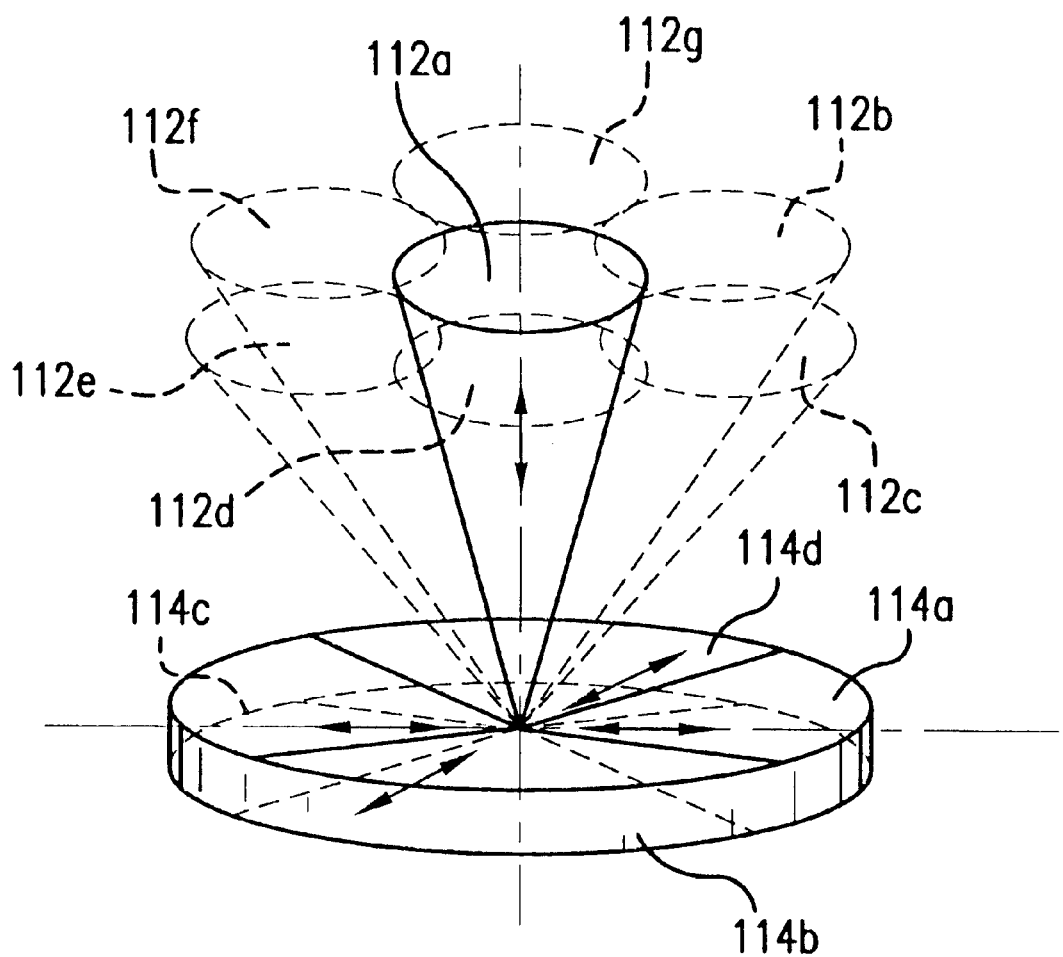
FIG. 24 schematically illustrates directivity characteristics of a transmission and reception signal light beam of the wireless communication optical transceiver according to the seventh embodiment of the present invention.

FIG. 24 schematically illustrates directivity characteristics of transmission and reception signal light beams of the wireless communication optical transceiver of this embodiment. The horizontal radiation system has directivity characteristics in four directions 114a through 114d, and the vertical radiation system has directivity characteristics in seven directions 112a through 112g. The lens 175 changes a direction of the light beam radiated by each light source in the vertical radiation system. Similarly, the lens 175 changes the direction of the light beam to be received by each photodetecting element. Therefore, this invention realizes spatial diversity in four directions in the horizontal radiation system and in seven directions in the vertical radiation system.

Figure 25:
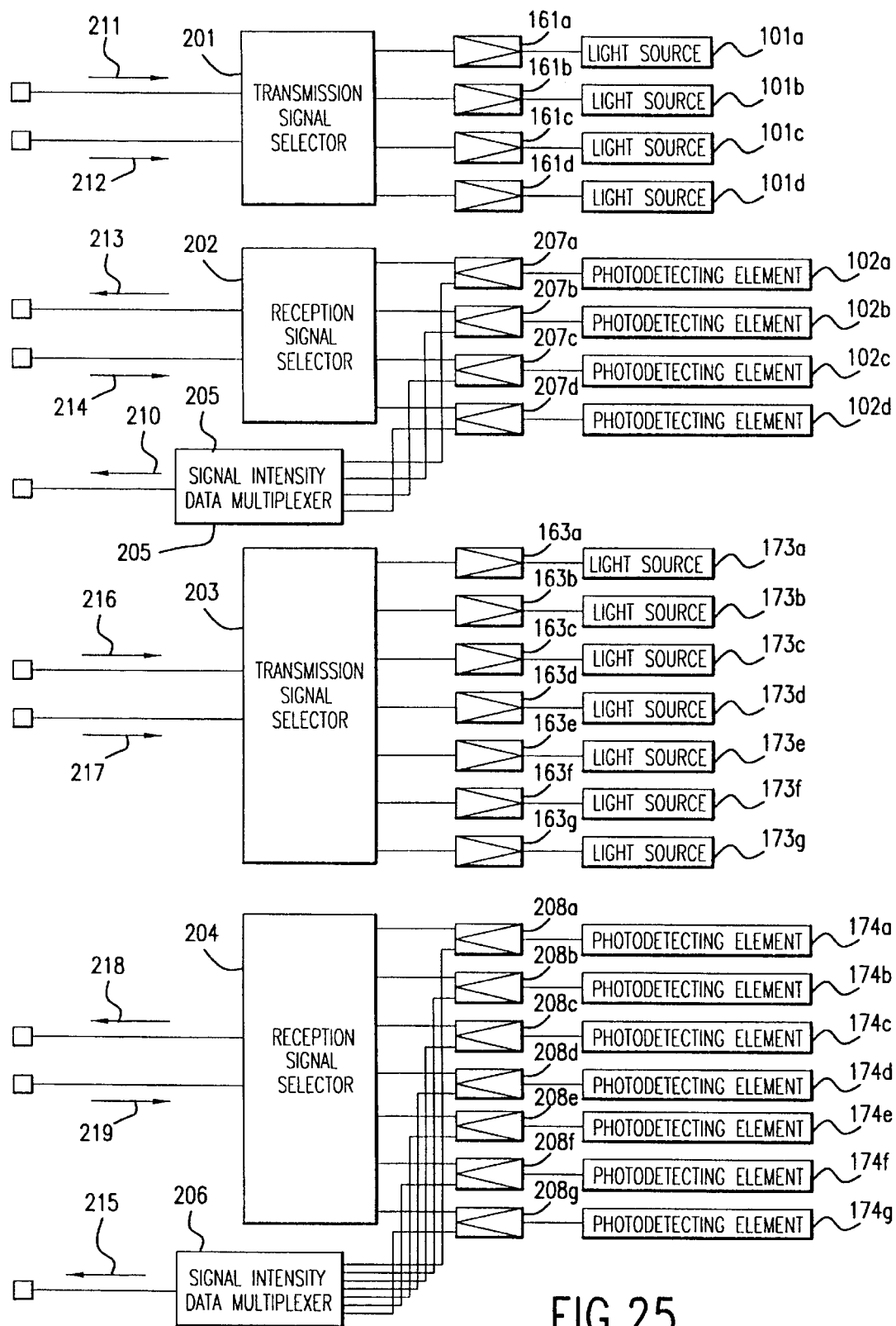
FIG. 25 illustrates a circuit configuration of the wireless communication optical transceiver according to the seventh embodiment of the present invention.

FIG. 25 shows a circuit configuration of the wireless communication optical transceiver of this embodiment. The horizontal radiation system consists of light sources 101a through 101d. Their drive circuits 161a through 161d, photodetecting elements 102a through 102d, and their amplifiers 207a through 207d, transmission signal selector 201, reception signal selector 202 and signal intensity data multiplexer 205. The vertical radiation system consists of light sources 173a through 173g, drive circuits thereof 163a through 163g, photodetecting elements 174a through 174g, amplifiers thereof 208a through 208g, transmission signal selector 203, reception signal selector 204 and signal intensity data multiplexer 206.

The amplifiers 207a through 207d amplify and shape the signals from the photodetecting elements 101a through 101d and transmit it, and digitize intensity data of the optical signals received by the photodetecting elements. The signal intensity data multiplexer 205 multiplexes the intensity data of the optical signals and transmits the produced data 210 to the host side. The transmission signal selector 201 selects a light source from the light sources 101a through 101d, to which a transmission signal 211 of the horizontal radiation system is supplied, in accordance with a selector control signal 212. Similarly, the reception signal selector 202 selects a photodetecting element from the photodetecting elements 102a through 102d, from which the received signal is picked up as a reception signal 213 of the horizontal radiation system, in accordance with a selector control signal 214.

Amplifiers 208a through 208d respectively amplify and shape the signals come from the photodetecting elements 174a through 174g and transmit them, and digitize the intensity data of the optical signals received by the photodetecting elements. The signal intensity data multiplexer 206 multiplexes the intensity data of the optical signals and transmits the produced data 215 to the host side. The transmission signal selector 203 selects a light source from the light sources 173a through 173g, to which a transmission signal 216 of the vertical radiation system is sent, in accordance with selector control signal 217. Similarly, the reception signal selector 204 selects a photodetecting element from the photodetecting elements 174a through 174g, from which the received signal is picked up as a reception signal 218 of the vertical radiation system, in accordance with a selector control signal 219.

Since the wireless communication optical transceiver of this embodiment has functions of spatial diversity for both of the horizontal radiation system and the vertical radiation system, it has the following effectiveness.

First, total amount of the transmission power, that is decrease consumption power can be decreased by employing spatial diversity, that is, consumption power can be decreased. At the beginning of the communication, since a transmission station does not know where a reception station is, it must transmit a signal to every direction to which it can transmit. But, once after the connection is established (the transmission station receives a signal from the reception station), the direction of the reception station can be detected in accordance with outputs of the signal intensity data multiplexers 205 and 206. After that, if the transmission station transmits a light signal to the direction of the detected reception station, the transmission power can be decreased.

Figure 26:
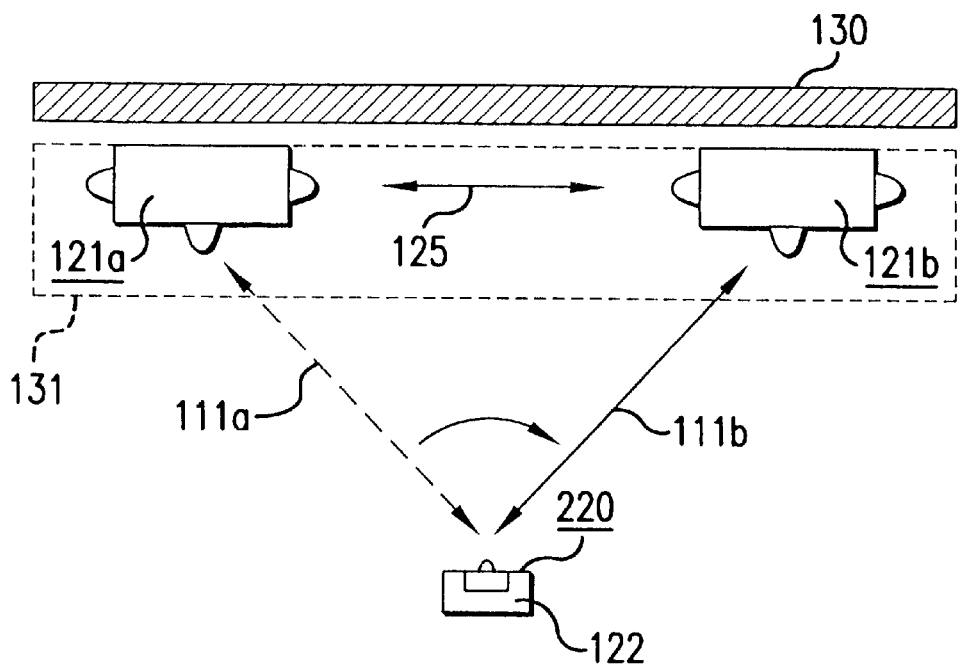
FIG. 26 schematically illustrates a hand-over of the mobile station 122 to star couplers 121a and 121b.

The function of spatial diversity in the horizontal radiation system supplies a function of handover. As shown in FIG. 26, a mobile station 122 provided with wireless communication optical transceiver 220 of the seventh embodiment are between two active star couplers 121a and 121b. In this case, the mobile station 122 must determine whether it links to the active star coupler 121a by means of horizontal radiation light signal 111a or links to the active star coupler 121b by means of light signal 111b. The mobile station 122 can comes link up to the direction from which the most intensive light signal comes, in accordance with data from the signal intensity data multiplexer 206 of the vertical radiation system. Generally, since the backbone network always has some traffic on an average, it can be determined from which direction the most intensive signal comes, that is, which base station (active star coupler) is near the mobile station 122, by watching data come from the signal intensity data multiplexer 206 of the vertical radiation system. As described in a prior art, generally, the hand-over requires the backbone network side (base station side) to determine a link. On the other hand, this invention has a remarkable effectiveness that the mobile station can control the hand-over.

Embodiment 8
Wireless Communication Optical Transceiver

Figure 27:
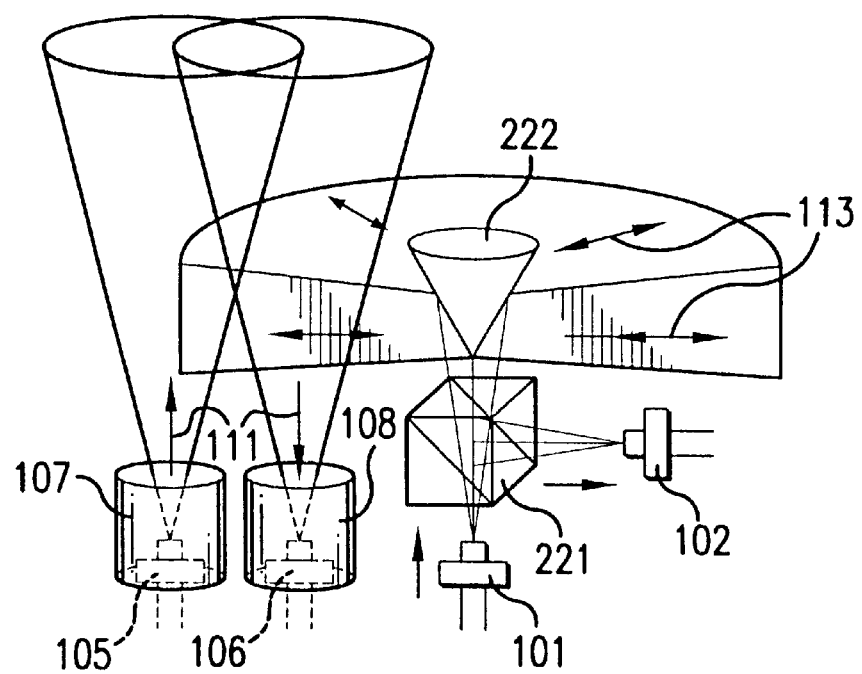
FIG. 27 illustrates a wireless communication optical transceiver according to an eighth embodiment of the present invention.
Figure 28:
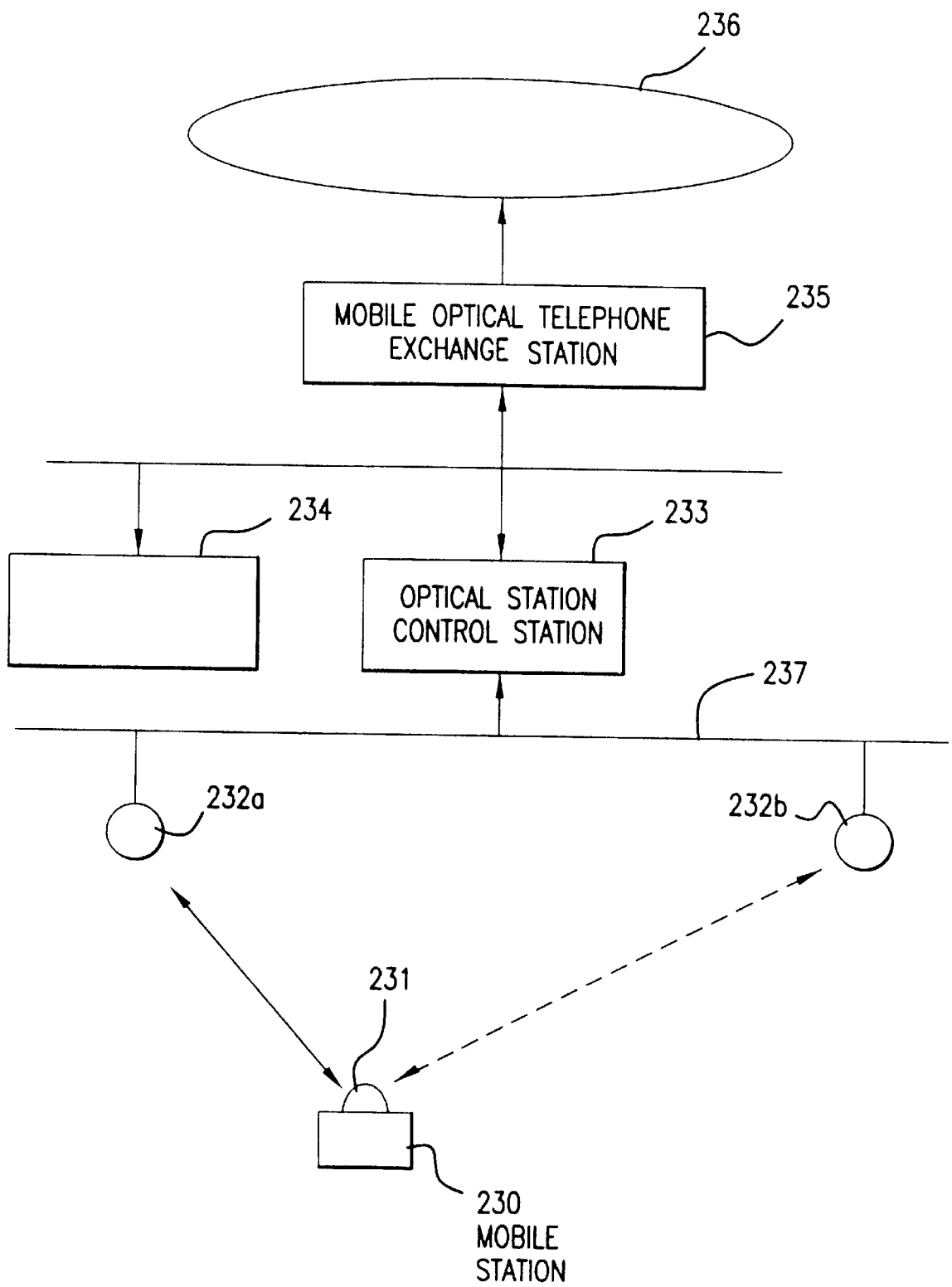
FIG. 28 schematically illustrates a conventional communication system disclosed in Hei. 3-91329.
Figure 29:
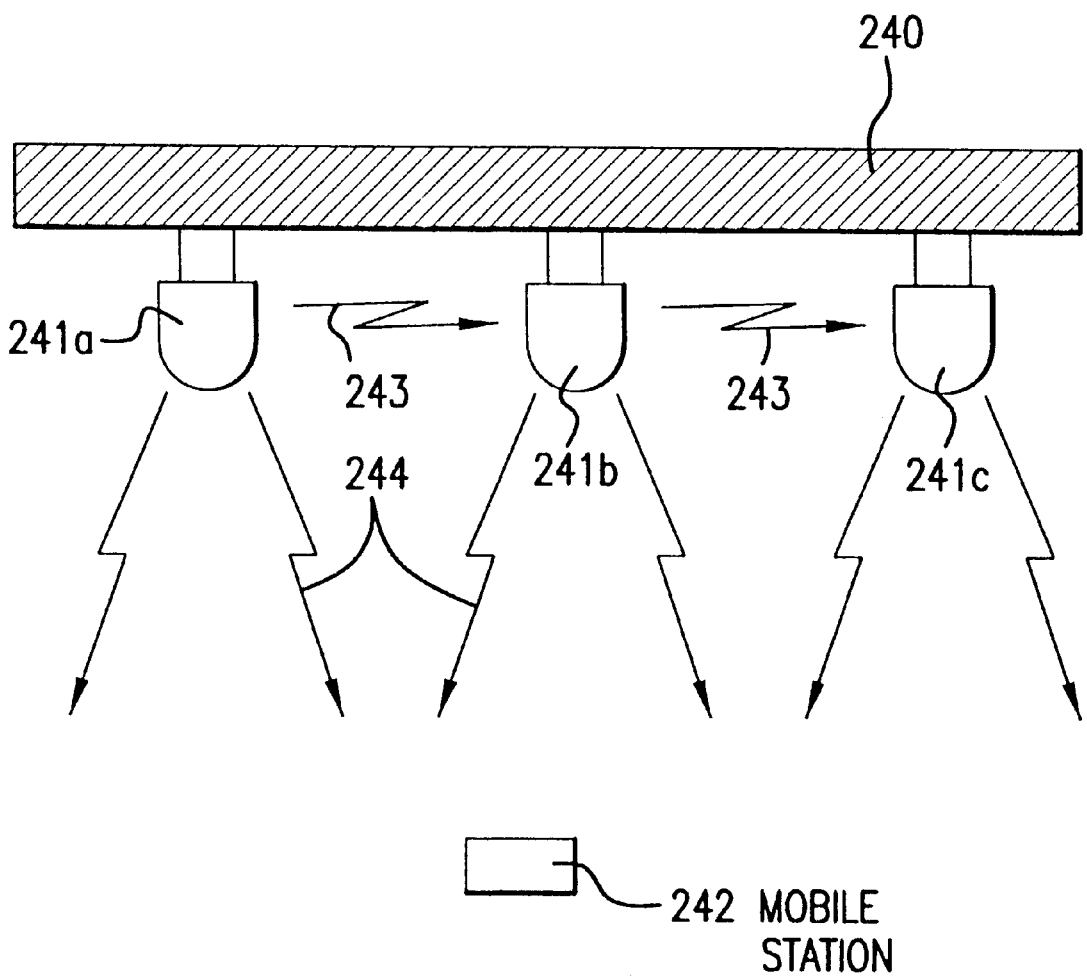
FIG. 29 schematically illustrates a conventional communication system disclosed in Hei. 3-92940.
Figure 30:
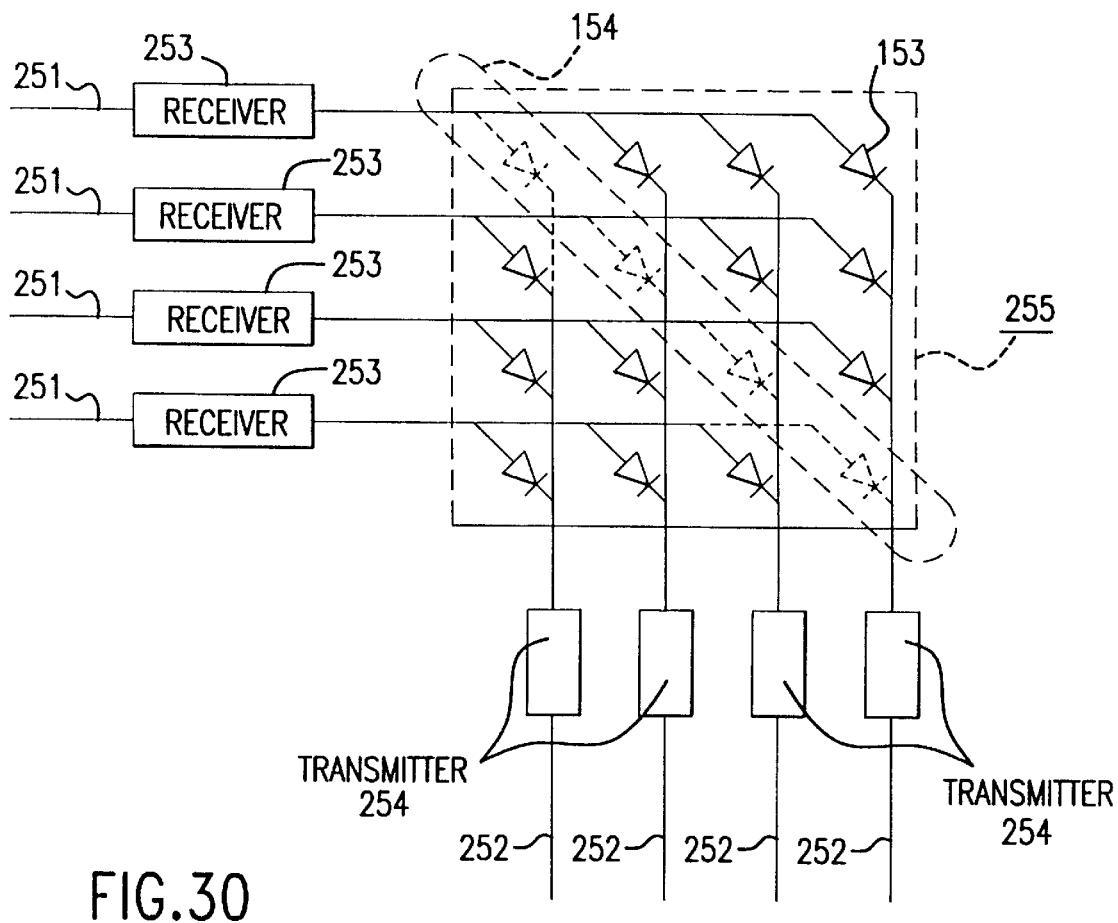
FIG. 30 schematically illustrates a conventional interconnectable active star coupler disclosed in a prior art reference Hei. 3-296332.

FIG. 27 shows a wireless communication optical transceiver according to eighth embodiment of the present invention. This embodiment is characterized by the axicon (conical) mirror employed for the horizontal radiation system. The horizontal radiation system has a light source 101 and a photodetecting element 102. A signal light beam from the light source 101 passes through a beam splitter 221, and is horizontally diffused by the axicon mirror 222. Meanwhile, a signal light beam which comes from horizontal direction passes through the axicon mirror 222 and the beam splitter 221, and is supplied to the photodetecting element 102. The other configuration is the same as that of the third embodiment shown in FIGS. 10A and 10B.

This embodiment has the advantage that the number of the light source and the photodetecting element of the horizontal radiation system can decrease. The beam splitter 221 can be replaced with a half mirror. Although FIG. 27 does not include a cylindrical lens 103 and lens 107, they can be used, of course.

As described in the embodiments, according to the light source for optical communication, the optical signal the band of which is narrowed and which has a low spatial coherence can be generated.

Further, according to the multiplexed optical transceiver of the present invention, the optical signal where wavelengths are multiplexed can be generated without using laser oscillation.

Also, according to the optical amplifier of the present invention, the semiconductor laser amplifier having the thick clad layer is obtained and therefore, the optical amplifier coupled with the plastic optical fiber having a large core diameter with a high coupling efficiency can be realized.

Additionally, according to the optical communication network of the present invention, the optical signal capable of transmitting through a free space can optically be amplified. Also, an adverse influence of the optical signal transmitted through the free space in respect of human eyes can be prevented.

The wireless communication optical transceivers according to the present invention can link mobile stations to the backbone network by means of the light emitter and photodetector of the vertical radiation system, and can link the mobile stations each other by means of the light emitter and photodetector of the horizontal radiation system.

Further, the active star coupler according to the present invention can distribute or relay among an optical signal propagating through the free space, an optical signal propagating through an optical fiber and a electric signal propagating through an electric line.

Further, the handy information terminal according to the present invention can avoid that the user shields the free space optical signal which is transmitted or received by wireless optical communication system of both the vertical and the horizontal directions.

Further, the optical communication network according to the embodiments of the present invention can link a mobile terminal to the backbone network, or link up mobile terminals together, arbitrarily.

Accordingly, this invention realizes a communication system which harmonizes a system like an optical wireless LAN, which links a backbone network to terminals, and a system like IrDA, which communicates among terminals.

What is claimed is:

1. A modulated light source for optical communication comprising:

spontaneous emission generating means for generating non-coherent light;

optical wavelength band narrowing means for narrowing a band of the light from said spontaneous emission generating means;

modulating means for modulating the light from said optical wavelength band narrowing means; and optical amplifying means for amplifying optically the light from said modulating means.

2. A modulated light source for optical communication comprising:

spontaneous emission generating means for generating non-coherent light;

modulating means for modulating the light from said spontaneous emission generating means;

optical wavelength band narrowing means for narrowing a band of the light from said modulating means; and optical amplifying means for amplifying optically the light from said optical wavelength band narrowing means.

3. A modulated light source for optical communication comprising:

spontaneous emission generating means for generating non-coherent light;

optical wavelength band narrowing means for narrowing a band of the light from said spontaneous emission generating means;

optical amplifying means for amplifying optically the light from said optical wavelength band narrowing means; and modulating means for modulating the light from said spontaneous emission generating means.

4. A modulated light source for optical communication comprising:

spontaneous emission generating means for generating non-coherent light in an optical waveguide;

optical wavelength band narrowing means for narrowing a band of the light from said spontaneous emission generating means;

modulating means for modulating the light from said optical wavelength band narrowing means; and optical amplifying means for amplifying optically the light from said modulating means.

5. A modulated light source for optical communication comprising:

spontaneous emission generating means for generating non-coherent light in an optical waveguide;

modulating means for modulating the light from said spontaneous emission generating means;

optical wavelength band narrowing means for narrowing a band of the light from said modulating means; and optical amplifying means for amplifying optically the light from said optical wavelength band narrowing means.

6. A modulated light source for optical communication comprising:

spontaneous emission generating means for generating non-coherent light in an optical waveguide;

optical wavelength band narrowing means for narrowing a band of the light from said spontaneous emission generating means;

optical amplifying means for amplifying optically the light from said optical wavelength band narrowing means; and modulating means for modulating the light from said spontaneous emission generating means.

* * * * *